United States Patent
Schwarzer

(10) Patent No.: US 6,429,864 B1
(45) Date of Patent: Aug. 6, 2002

(54) METHOD FOR TRAVERSING A BINARY SPACE PARTITION OR OCTREE AND IMAGE PROCESSOR FOR IMPLEMENTING THE METHOD

(75) Inventor: Jesko Schwarzer, Bonn (DE)

(73) Assignee: create.it services AG, Düsseldorf (DE)

( * ) Notice: Subject to any disclaimer, the term of this patent is extended or adjusted under 35 U.S.C. 154(b) by 41 days.

(21) Appl. No.: 09/709,101

(22) Filed: Nov. 9, 2000

Related U.S. Application Data

(63) Continuation-in-part of application No. 09/437,847, filed on Nov. 10, 1999.

(51) Int. Cl.⁷ .............................................. G06T 17/00
(52) U.S. Cl. ...................................... 345/419; 345/427
(58) Field of Search ............................... 345/418, 419, 345/420, 423, 424, 421, 422, 427

(56) References Cited

U.S. PATENT DOCUMENTS

| | | | | |
|---|---|---|---|---|
| 6,275,233 B1 | * | 8/2001 | Gueziec | 345/419 |
| 6,326,964 B1 | * | 12/2001 | Snyder et al. | 345/419 |
| 6,353,677 B1 | * | 3/2002 | Pfister et al. | 345/424 |
| 6,362,820 B1 | * | 3/2002 | Hoppe | 345/423 |

FOREIGN PATENT DOCUMENTS

| | | |
|---|---|---|
| WO | WO 96/17326 | 6/1996 |

OTHER PUBLICATIONS

Samet, H., et al., IEEE Computer Graphics and Applications, Jul. 1988, pp. 59–75: "Hierarchical Data Structures and Algorithms for Computer Graphics".

Glasser, A., IEEE Computer Graphics and Applications, Oct. 1984, pp. 15–22: "Space Subdivision for Fast Ray Tracing".

Fujimoto, A., et al., IEEEE Computer Graphics and Applications, Apr. 1986, pp. 16–26: "Arts: Accelerated Ray–Tracing System".

Press, W.H., et al., "Numerical Recipes in C—The Art of Scientific Computing", Cambridge University Press, pp. 117–119 (1992).

* cited by examiner

Primary Examiner—Cliff N. Vo
(74) Attorney, Agent, or Firm—Scully, Scott, Murphy & Presser

(57) ABSTRACT

Provided is a method for traversing a space partition, especially a quadtree or octree. Through the intermediary of a quadtree or, respectively, octree partitioning of a surface or, respectively, a space there can be adaptively parceled the surface or respectively, space such that contained structures therein are suitably encompassed by the different sub-cells of the partition. The proposed method pertains to the traversing of that type of sub-cell structure with a semi-infinite straight-line or ray. Emitted in sequence are the traversed terminal cells of the space partition.

35 Claims, 15 Drawing Sheets

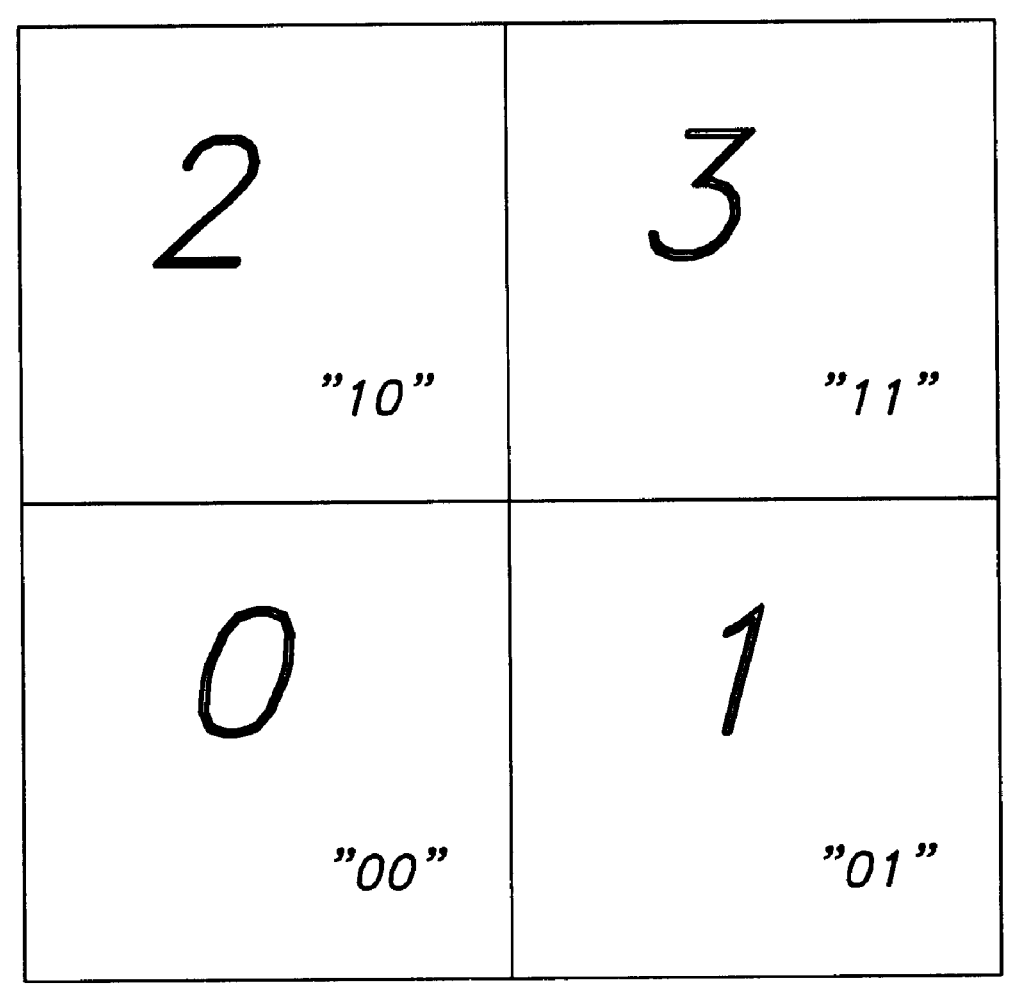

| 2 | 3 |
|---|---|
| "10" | "11" |
| 0 | 1 |
| "00" | "01" |

FIG. 3

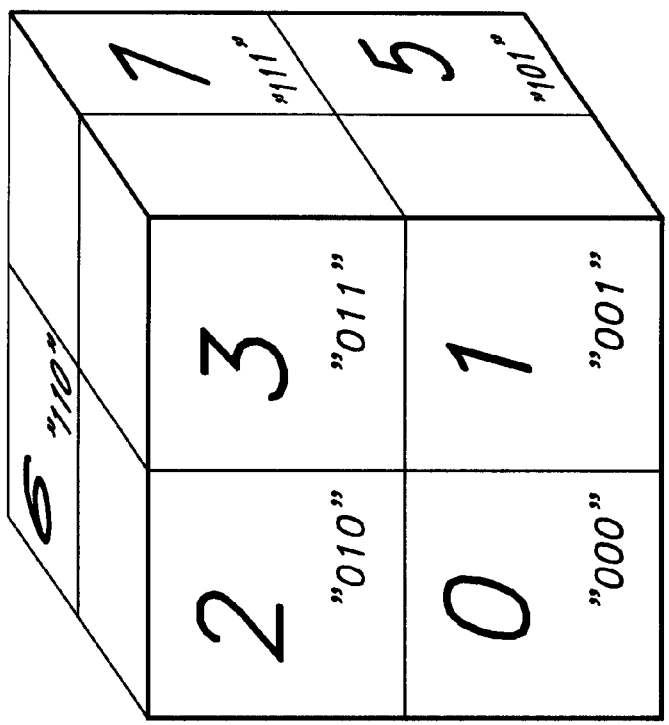
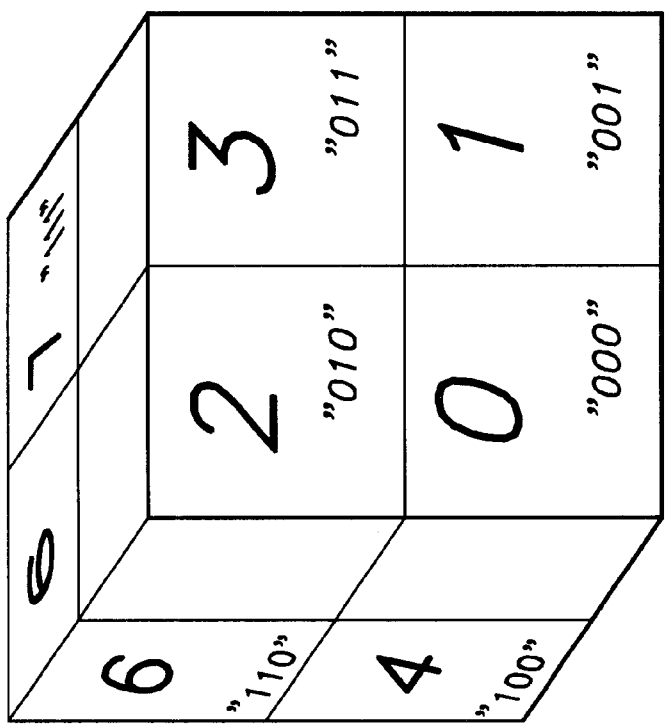
FIG. 6

$\Rightarrow$ Indicates for the Quadtree  3;0;2;1

| x-Stepwidths | y-Stepwidths | yerror |
|---|---|---|
| $2^{\text{Maximum depth}}$ | $\lfloor y = m_y \cdot 2^{\text{Maximum depth}} \rfloor$ | $y - \lfloor y \rfloor$ |
| $2^{\text{Maximum depth}}$ | $\lfloor \frac{y}{2} \rfloor$ | $\frac{y}{2} - \lfloor \frac{y}{2} \rfloor$ |
| ⋮ | ⋮ | ⋮ |
| $2^1$ | $\lfloor \frac{y}{2^{\text{Maximum depth}-1}} \rfloor$ | |
| $2^0$ | $\lfloor \frac{y}{2^{\text{Maximum depth}}} \rfloor$ | |

FIG. 11A

| | x-Stepwidths | y-Stepwidths | yerror |
|---|---|---|---|
| Step Implemented | 16 | 6 | 0.08 |
| | 8 | 3 | 0.04 |
| — | 4 | 1 | 0.52 |
| ✓ | 2 | 0 | 0.76 |
| ✓ | 1 | 0 | 0.38 |

FIG. 11B

$$\begin{array}{cc} \Delta f_y & 0.3714 \\ \text{error} \;\;\oplus & 0.76 \\ \hline & 1314 \end{array} \qquad \begin{array}{c} 5F14 \\ \oplus \; C28F \\ \hline \boxed{1}\,21A3 \end{array}$$

$$\boxed{Transfer\ 1}$$

$$\Rightarrow yerror\_new = 0.1314 \;\hat{=}\; 21A3$$

FIG. 12

```
x - coordinates  12       1 1 0 0
y - coordinates  11       1 0 1 1
                          ↑ ↑ ↑ ↑
                         11 | | |
                            01| |
                              10|
                               10
```

$\Rightarrow$ Indices for the Quadtree 3;1;2;2

FIG. 13

```
y   error        y.error
6   0.08    ..0  1  1  0. 0  0  0  1' 0  1  0  0 '0  1  1  1' 1  0  1  0
                              ↘42
3   0.04    ..0  0  1  1. 0  0  0  0' 1  0  1  0' 0  0  1  1' 1  1  0  1

```
                                                              ┌44
 0  0  0  1  1  0  0  0  0  1  0  1  0  0  0  1  1  1  1  0  1  0
       ┌46 ┘└         ┌45              ┘
    ┌48  ┘└              ┌47              ┘
  ┌50 ┘└                    ┌49              ┘
```
y.error

FIG. 14B

| Step Implemented | x-Stepwidths | y-Stepwidths | yerrors |
|---|---|---|---|
| – | 16 | 3 | 0.04 |
| (√) | 8 | 1 | 0.52 |
| √ | 4 | 0 | 0.76 |
| – | 2 | 0 | 0.38 |
|  | 1 | 0 | 0.19 |

| x-Decrements | y-Decrements | yerror | z-Decrements | zerror |
|---|---|---|---|---|
| 8 | 3 | 0.84 | 3 | 0.44 |
| 4 | 1 | 0.92 | 1 | 0.72 |
| 2 | 0 | 0.96 | 0 | 0.86 |
| 1 | 0 | 0.48 | 0 | 0.43 |

FIG. 18

METHOD FOR TRAVERSING A BINARY SPACE PARTITION OR OCTREE AND IMAGE PROCESSOR FOR IMPLEMENTING THE METHOD

CROSS REFERENCE TO RELATED APPLICATION

This application is a continuation-in-part of application Ser. No. 09/437,847, filed Nov. 10, 1999.

The invention relates to a method for traversing a partition tree in the direction of a semi-infinite straight-line and to an image processor for implementing the method. In particular, the present invention relates to a method for the computer-supported image generation, whereby there is tracked the path of individual rays (ray tracing).

During ray tracing, this relates to a known method to be able to compute three-dimensional views of an object or a scene in that the ray path of the light beams which strike on the image plane are computed pixel by pixel. For more complex ray tracing methods, not only are the rays considered which when emanating from the objects strike against the image plane, but also those rays are considered which illuminate the object or, respectively the scene (secondary rays, tertiary rays). With the aid of such types of complex ray tracing processes, there can be generated three-dimensional views of objects of a high quality; through a consideration of secondary rays it is in particular possible to also consider reflections and illumination effects.

The disadvantage of all ray tracing methods; however relates to the extreme high demand on computation, which renders the method extremely time consuming. With regard to every light beam there must be computed as to whether and when at which location there is effected the striking against a specified three-dimensional surface structure. When there should also be considered additionally secondary rays, then the demand for computational output becomes immense.

There have been proposed different methods for accelerating the ray path computation. As a rule, the rays must pass through large volumes of open spatial regions prior to an eventual impact against a surface of the object which is to be represented, and in which regions no surface structures are located. Due to this reason, there can be precluded any collision of a ray with a surface for these open spatial regions. Due to this reason it has been attempted to detect these open spatial volumes most skillfully and flatly as so to preclude from any consideration collisions between rays and surfaces. Also there must be considered that the objects which are to be represented should be packaged most skillfully in a fitting encompassing volume, and to implement only within the encompassing volume a collision of ray-surface.

It is known to encompass the different objects which are to be represented with spherical hemispheres or shells. In order to determine into which hemispherical shell the ray then enters, there are however required the implementing distance computations which, for spherical surfaces, necessitate a considerable amount of computing time. It is more advantageous to utilize cubic or, respectively parallelepiped encompassing volumes. For example, the scene which is to be represented can have a cubic grid superimposed thereon, whereby for every cube element there must be provided a memory storage as to whether it does or does not contain a surface structure. However, this leads to an increase in demand for memory storage to the third power for the side length of the encompassing spatial region. A large surfaced, empty spatial region must during this method be represented by a multiplicity of empty cube elements, whereby for every cube element there must be individually interrogated as to whether it is also actually empty. It would be better, however, with regard to a large-surfaced empty spatial region to be able to determine by means of a single interrogating step that the latter does not contain any structures.

For this purpose there are known adaptive spatial partitions, in which a spatial volume is divided in dependence upon local conditions into larger volume or smaller volume cubes. For the two-dimensional case, this method of surface partition is known under the name "quadtree", while here every quadrate is divided in accordance with need into four subsidiary quadrates. Such a quadrate partition is represented in FIG. 2.

In the three-dimensional case, a certain spatial cube is divided, as needed, into eight sub-cubes. For the three-dimensional case, the method of the adaptive spatial partition is known under the name "octree". FIG. 5A illustrates such type of an octree partition.

For the purpose of ray tracing there is afforded the utilization of such types of adaptive spatial partitions. In all instances, one must be able to compute which of the different cubes are to be traversed by a semi-infinite straight line or ray consecutively.

Accordingly, it is an object of the invention, to render available for the ray-based image generation (ray tracing) a rapid, computer-supported method for traversing a space partition in the direction of a semi-infinite straight line or ray, which in succession delivers the terminal cells of the space partition which are traversed by the rays. Furthermore, it is an object of the invention to make available an image processor for implementation of the inventive method, which enables the terminal cells of the space partition which are traversed by the rays to be detected at a high rate of speed.

The object of the invention is solved by means of a method for traversing a partition tree in the direction of a ray pursuant to claim 1 and claim 22, as well as through an image processor pursuant to claim 27.

Pursuant to the inventive method there are in succession determined the terminal cells of the space partition which are traversed by a ray. For this purpose, the intersecting point of the successive terminal cell is determined with the aid of a sequence of decrements. In order to determine the intersecting point it is accordingly not necessary to have to perform an intersection computation which would necessitate time consuming division operations. Instead thereof, the intersecting point is determined by a small number of decrementing steps. For the implementation of every decrementing step there are exclusively required integer operations. As a result, the method can be implemented very rapidly by means of a computer or an image processor.

Every decrement of the utilized sequence of decrements is effected by a halving from the preceding decrement. The decrements of the sequence are consequently in a ratio of powers of two. This determination of the decrements corresponds to a "binary search", the intersecting point can be attained in this manner with the lowest possible number of decrementing steps. This determination of the decrements represents an optimization of the operational speed.

As to whether the terminating conditions is fulfilled, can be simply tested by a computer or image processor. It must be merely interrogated as to whether the respective decremented distance is zero or not. This testing can be implemented at a rapid speed.

The inventive method is particular optimized for the utilization in computers and processors, and achieves therein a heretofore not possible processing speed during image generation by means of ray tracing. The individual rays during a ray tracing method can be tracked by means of the inventive method at a previously unknown rapidity. In particular, by means of the inventive method it is possible to completely preclude large spatial regions which are penetrated by the semi-infinite straight-lines or rays from a collision testing between rays and surfaces.

It is advantageous when step (e) is only implemented during the first traversal. The computation of the decrements for each semi-infinite straight-line or ray need be effected precisely only a single time. For determining the individual terminal cells which are traversed by the ray there can always again be reached back to the singly determined decrements.

It is also of advantage when step (e) is not implemented between (d) and (f), but at a suitable location prior to step (d). The different decrements can also be previously determined for a specified semi-infinite straight-line.

Pursuant to a further advantageous embodiment of the invention, the components of the directional vector are so permutated prior to beginning of the method, so that the x-components become the main components, in essence, the relatively largest components. The method is thereby applicable for suitable directional vectors also when for these directional vectors, initially the y-components or the z-components were the relatively largest components of the vector.

It is advantageous when, with regard to the terminal cell determined in step (c), it is tested as to whether this relates to a structure filled cell or to an empty cell. For the instance, in which it relates to an empty cell, there does not have to be implemented any collision computation between rays and surfaces for this cell. This enables large surfaced or, respectively spatial regions to be previously precluded from the collision consideration.

For the case in which the terminal cell is a structure-filled cell, with regard to this cell there is determined as to whether the semi-infinite straight-line or ray collides with the therein contained structure. In this instance, there must thus be implemented the collision computation between rays and surfaces. This collision computation can have two possible results: either the ray strikes the therein contained objects, or the ray misses the objects. In the case in which the ray misses the objects, it traverses the space partition further, and to that extent, the next terminal cells which are traversed by the ray must be determined. At the presence of a collision of the semi-infinite straight-line with the structure contained in the terminal cell, the method is completed in that regard.

It is of advantage when during decrementing which is repeated in step (f), the main components as well as also the secondary components of collective distances determined in step (d) there is began with the decrement "edge length of the encompassing terminal cell" in the main components. In this manner, during repeated decrementing the first decrements can be skipped over. This leads to an additional time saving, and the method consequently becomes more rapid.

It is of advantage when the initial offset which belongs to the starting point is determined through the setting to zero the initial offset of the main components, as well as through the computing of the associated initial offset of the secondary components. In this manner there is achieved with respect to the main components there can be computed in integers or in whole numbers. After-decimal point or fractional integer locations consequently need not be considered with regard to the main components. Also, there is achieved thereby a further acceleration of the method. In order to. determine the terminal cell of the space partition which encompasses a specified unit cell, there is applied the method pursuant to claim 12. Through a columnar readout of the line-wise arranged binary coordinates of the impact point of the unit cell, there can be extremely rapidly determined the indices for the applicable sub-tree.

This advantage when the starting points given in a suitable original coordinate system recalculated by means of the factor $g=2^{maximum\ depth}/r$ into the coordinate system of the partitioned region with the side length $2^{maximum\ depth}$, whereby r represents the maximum expanse of the original coordinate system. With the aid of scaling at the factor g, a transition can be formed from a suitable coordinate system into a coordinate system with the side length $2^{maximum\ depth}$. For the case in which the original coordinate system also encompasses negative coordinate values, it is initially displaced through a translation into the non-negative coordinate range. Mostly, there is utilized a Cartesian coordinate system. However, other suitable vector spaces can be utilized which are plotted through linearly independent base vectors, whereby the base vectors need not necessarily be orthogonal.

The inventive image processor for implementing the method compasses means for determining the distances from the walls of the encompassing terminal cell, means for decrementing said collective specified distances, means for determining the contiguous unit cell, and means for determining that terminal cell which encompasses said contiguous unit cell. The decrements can be computed prior to or during the implementation of the method. As soon as these decrements are present, the method can be implemented at a high rate of speed.

It is advantageous when the whole numbered portions of the decrements in the subsidiary directions are represented as integer numbers. It is furthermore of advantage when the fractional value portions of the decrements in the subsidiary directions are represented as integer numbers. Furthermore it is of advantage when the initial offsets are represented as integer numbers. Integer numbers can be processed by the image processor at a high speed. Also, fractional or decimal fractional numbers can be represented through integer numbers, in which the range from 0 to 1 is formed on the corresponding region by integers or whole numbers. In accordance with the amount of bits which the integer number encompasses, there can be adjusted the accuracy to the present need.

Pursuant to an advantageous embodiment of the invention, the entire sequence of the decrements of the main components as well as of the associate decrements of the secondary components are produced by means of slide registers. This has the advantage for the readout of the different decrements, a single readout port is adequate, through which there can be successively read out the entire sequence of the decrements.

Alternatively thereto, it is possible to produce the entire sequence of the decrements of the main component as well as of the associated decrements of the secondary components by means of a multiplicity of readout ports which are each offset relative to each other by one bit. In this manner, collective decrements are immediately available, which is of particular advantage for the parallelization of the method.

It is also advantageous when the image processor for implementing the inventive method compasses an array in which the binary representations of the n truncated coordinate bits of a point of the unit cell are stored. By means of that type of array there can be simply implemented a columnar readout of the truncated coordinates.

Further details and advantage of the invention are explained hereinbelow on the basis of a plurality of exemplary embodiments as represented in the drawings. Illustrated is that:

FIG. 3 is an advantageous indexing of the subcells of the quadtree;

FIG. 6 is an advantageous indexing of the subcells of the octree;

FIG. 11A is a table from which there can be ascertained the manner in which there can be computed the inventive method necessary sequence of decrements for the main components as well as for the secondary components;

FIG. 11B illustrates a table which contains a descending sequence of x- and y-decrements for the example represented in FIG. 7;

FIG. 12 illustrates a computational example of the error-arithmetic utilized for the processing of the fractional, after decimal point locations;

FIG. 13 illustrates an example as to the manner in which, proceeding from a specified unit cell, there can be found the encompassing terminal cell of the quadtree;

FIG. 14A illustrates an advantageous method for determining the sequence of y-decrements through a shifting to the right of the entire bit-structure;

FIG. 14B illustrates an advantageous method for determining the sequence of y-decrements with the aid of a multiplicity of readout ports which are each offset relative to each other by respectively one bit;

FIG. 18 illustrates a table of x-, y- and z- step intervals with regard to the example shown in FIG. 17A.

Figure 1:
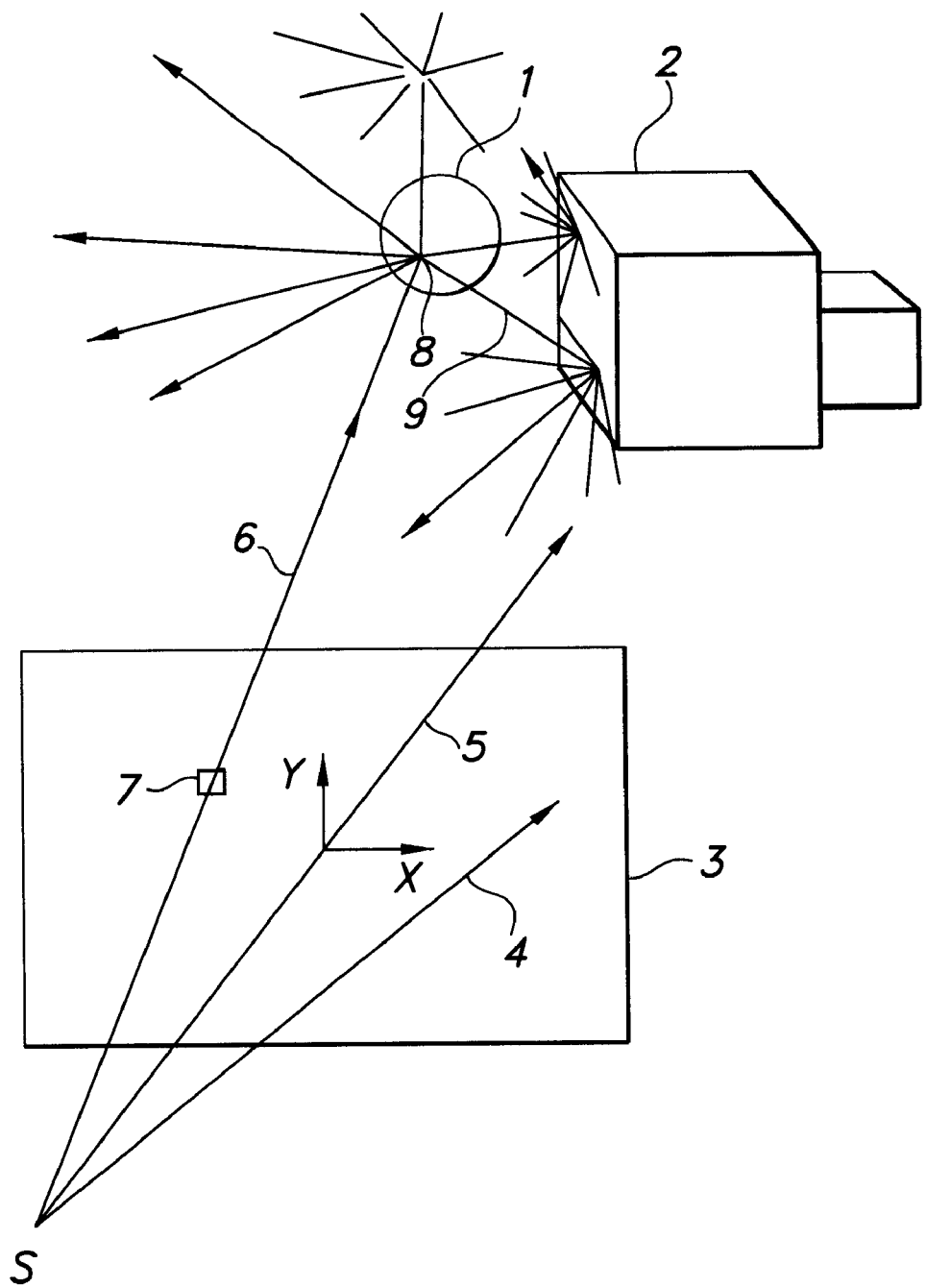
FIG. 1 shows the principal of the image generation by means of ray tracking (ray tracing)

In FIG. 1 there is illustrated an overview with regard to the method for the ray based computation of the viewing of three-dimensional object and scenes. The two objects 1 and 2 should hereby so appear in the picture or image plane 3, as they would appear to an observer from the observation point S. For image computation, one commences from a bundle of rays 4, 5, 6, which projecting from the observation point S impinge the objects. The ray 6 hereby passes through the image plane point 7 impinges at point 8 against the surface of the object 1. This signifies, that the image point 7 obtains its light from the thus determined impact point 8. The brightness and coloration of the image plane point 7 is thereby determined by the light transmitted from the impinging point 8 in the direction towards the image plane point 7. The impact point 8 of the object 1 obtains, on the one hand, light from eventual illumination sources and, on the other hand, through directed or diffused reflections at other objects. The impact point 8, for example, obtains light which is reflected by the object 2 (light beam 9).

During the image computation by means of ray tracing it is significant that the collisions of the different light beams or rays with the different objects are determined in the most possibly efficient type and manner. Thereby, it is of advantage that the different objects are encompassed by means of simple geometric forms, so as to in this manner be able to preclude large spatial regions from the collision testing between rays and object surfaces.

Figure 2:
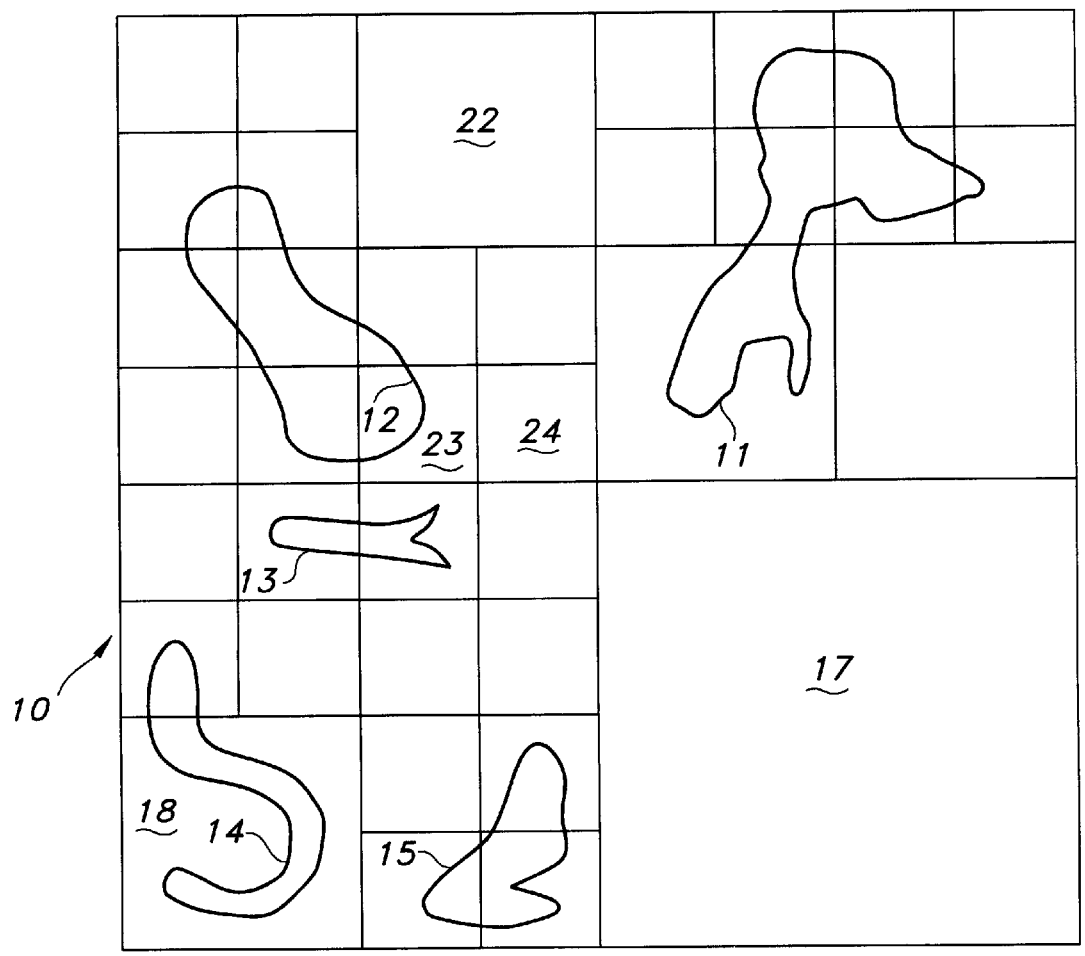
FIG. 2 is an example for a quadtree partitioning, which encompasses different two-dimensional objects.

For this purpose, in FIG. 2 there is illustrated an example for an adaptive surface partition in accordance with the quadtree method. A defined, quadratic (or right-angled) surface area 10 hereby contains the two-dimensional objects 11 through 15. In order to enclose these now through suitably dimensioned quadrates, the following method is applied: The entire quadrate is initially divided into four sub-quadrates. For the indexing of the individual sub-quadrates there is utilized the diagram as illustrated in FIG. 3; meaning that the lower left sub-quadrate receives the index "0", the lower right sub-quadrate receives the index "1", and so forth.

After the first subdivision of the entire quadrate, there can already be determined that the right lower sub-quadrate 17 in FIG. 2 does not contain any objects.

This large surface area 17 can be then characterized as "empty" respectively, "containing no structures". With regard to the sub-quadrants with the indices "0", "2", and "3" there is required a further sub-division into, respectively, four sub-quadrates. In a few of the sub-quadrates obtained during this step, for example, in the sub-quadrates 18 and 22, the thus obtained resolution is adequate. The sub-quadrate 18 is characterized as "structure filled" due to the therein contained object 14, whereas sub-quadrate 22 is "empty". For other sub-quadrates obtained during this step, a further sub-division is necessary.

Figure 4:
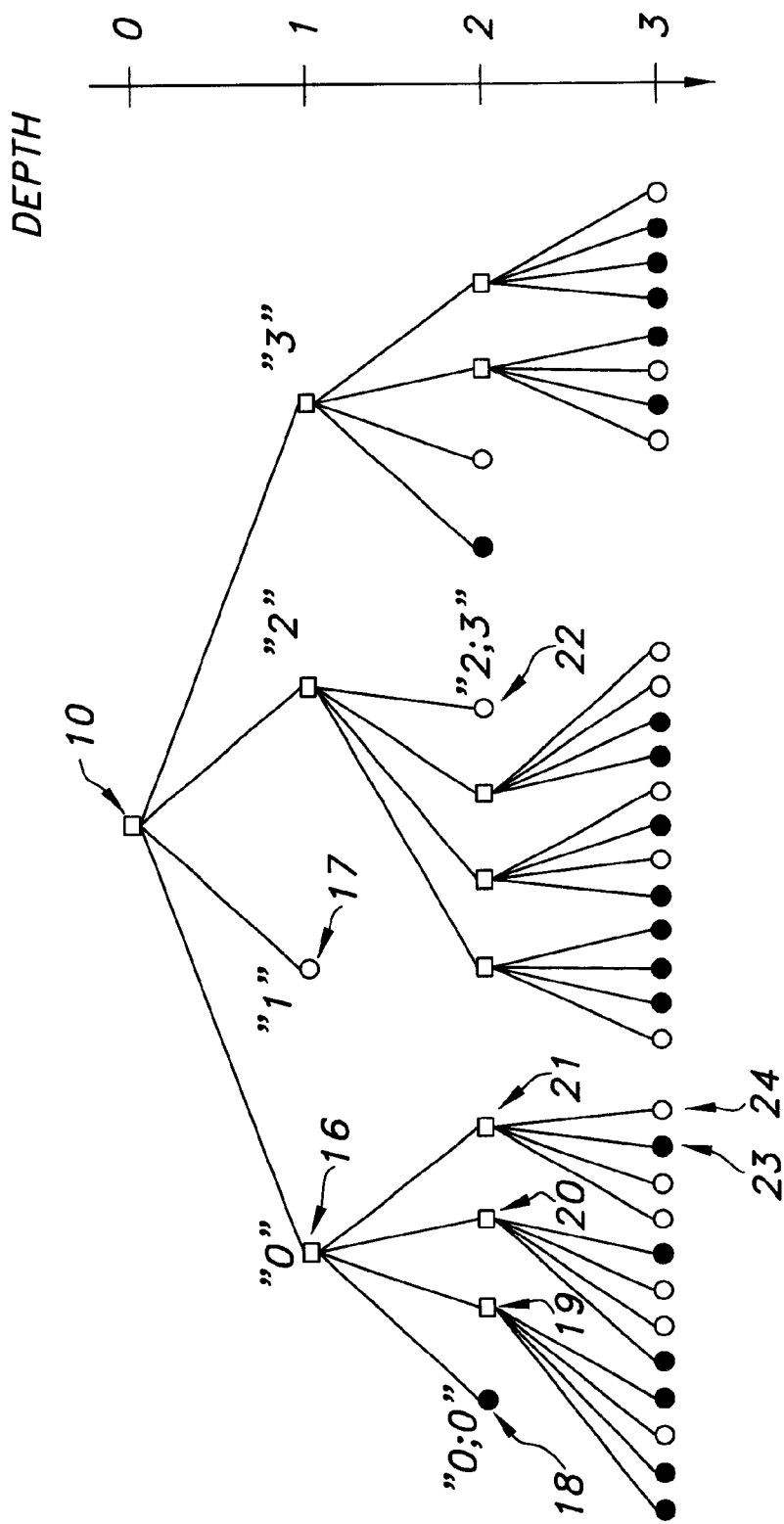
FIG. 4 is the quadtree belonging to the partitioning as illustrated in FIG. 2.

By means of the partition tree which is illustrated in FIG. 4, the actual quadtree, there can be illustrated the surface partition obtained in FIG. 2. This partition tree is isomorphous to the surface division illustrated in FIG. 2. The entire quadrate hereby corresponds to the nodal 10. The entire quadrate is divided into four sub-quadrates with the indices "0", "1", "2" and "3". Consequently shown in FIG. 4 extending from the nodal point 10 are drawn four arms, which lead to four sub-nodal points in dividing depth 1 (see the scale of the dividing depth on the right side of FIG. 4). The sub-nodal point 17 with the index "1" need no longer be further sub-divided; here, it relates to a so called "terminal nodal point". With regard to the remaining sub-nodal points of the dividing depth 1, the respectively four arms lead to, respectively, four sub-nodal point of the dividing depth 2. The nodal point 16 possesses the sub-nodal points 18, 19, 20 and 21, of sub-nodal points which the nodal point 18 is a terminal nodal point. The nodal point 18 can be identified by the sequence of indices "0; 0".

The nodal points 19, 20 and 21 are non-terminal nodal points, and, as a result, are further sub-divided. As a result, one comes to the nodal points of the dividing depth 3, which is here the specified maximum dividing depth of the partition. Nodal point 24 is one of the sub-nodal points of the dividing depth 3. Nodal point 24 is a terminal, non-structure filled nodal point. The neighboring terminal nodal point 23, in contrast therewith, is structure-filled, and as a result is shown in FIG. 4 as being solid black.

Figure 5A:
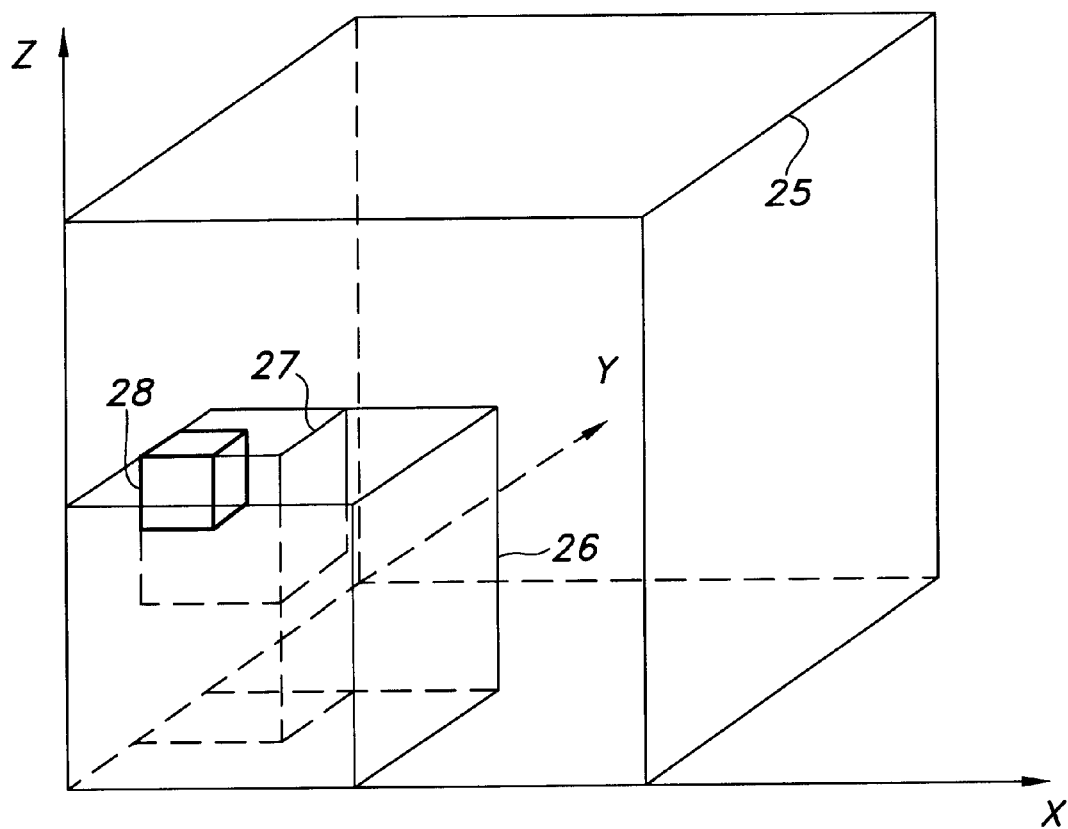
FIG. 5A is the localization of a subcell in an octree-spatial partitioning.

This partition principle also applicable to the three-dimensional case in essence to the sub-division of a cube or, respectively, parallelepiped block. The cube 25 illustrated in FIG. 5A is sub-divided into eight sub-cubes. One of these so-obtained sub-cubes is the cube 26. Through the partitioning into eight parts of the cube 26, among others there is obtained the cube 27. This cube corresponds to the dividing depth 2. Through further sub-division of the cube 27 there is then obtained the cube 28, which represents the smallest cube of the partition. This partition possesses the maximum depth 3.

The indexing of the different sub-nodal points which are utilized for the three-dimensional case is illustrated in FIG. 6. The front four sub-cubes are designated with the indices "0", "1", "2" and "3"; the four rear sub-cubes, as illustrated, can be identified on the basis of the indices "4", "5", "6" and "7". In FIG. 6 there are also represented the binary locations ("000"through "111") of the respective indices. Thereby the cubes which are located below each other adjacent each other or behind each other, distinguish themselves in precisely one bit of their binary represented index.

Figure 5B:
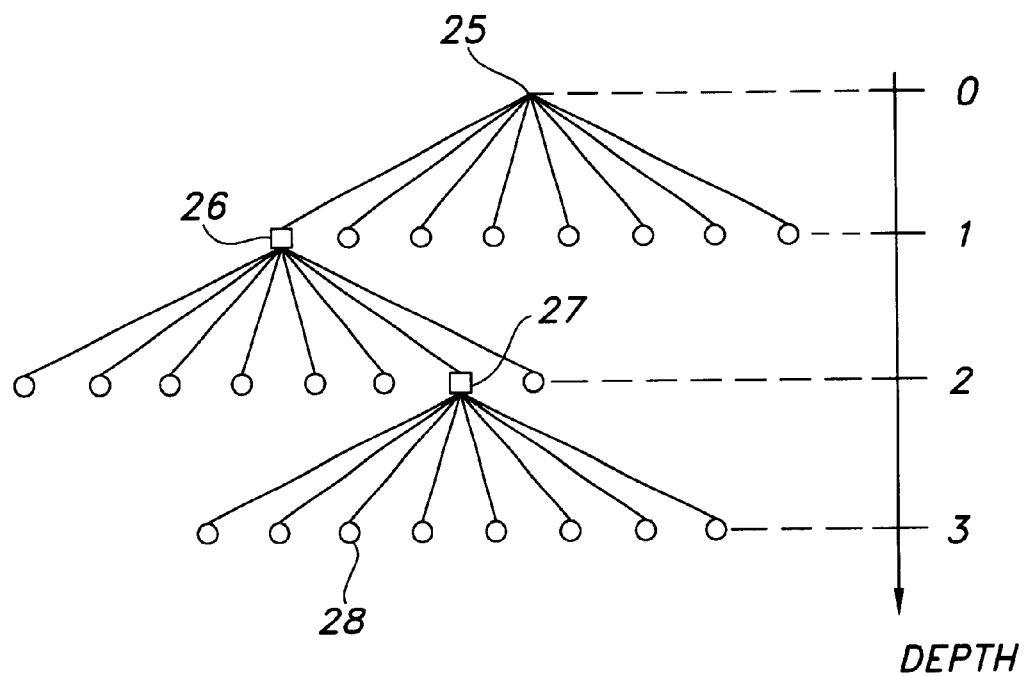
FIG. 5B is the octree structure belonging to the partitioning of FIG. 5A.

FIG. 5B represents the partition tree, the actual octree, which belongs to the spatial partition illustrated in FIG. 5a. The name "octree" results that from each nodal point there extend eight arms for the applicable sub-nodal points. Through sub-division of the entire cube 25, one comes to the sub-nodal point 26, which can be identified by the index "0". The rear left upper sub-cube of the cube 26 is the sub-cube 27, which is characterized by the sequence of indices "0;6". Through the further sub-division of this cube, one comes to cube 28, which is reached by the index sequence

TRAVERSING A TWO-DIMENSIONAL QUADTREE STRUCTURE WITH A SEMI-INFINITE STRAIGHT-LINE OR RAY

Figure 7:
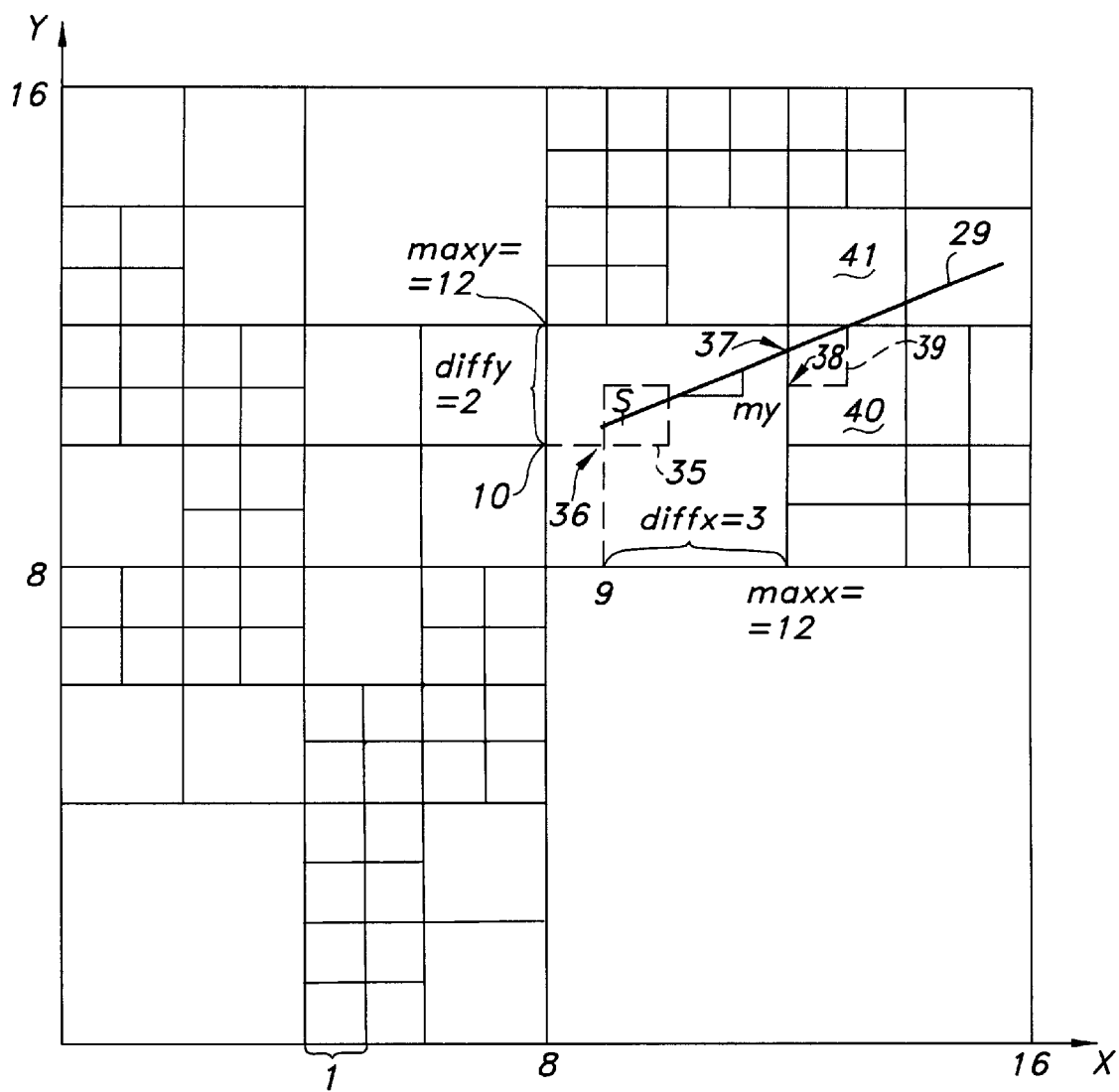
FIG. 7 is an example for the inventive traversing of a two-dimensional quadtree-structure by means of a: semi-infinite straight-line or ray.

FIG. 7 illustrates a quadratic surface which by means of the quadtree method, is sub-divided into a multiplicity of sub-quadrates of different size. The associated quadtree possesses the maximum depth 4. The individual sub-quadrates of the quadtree sub-division can be either empty or structure-filled. In particular, the individual quadrates of the subdivision can contain objects of the type shown in FIG. 2 (objects 11 through 15).

Expediently, the partitioned quadrate is provided with a coordinate system which is correlated with the binary sub-divisions. Thereby, the side length of the sub-quadrate of the lowermost sub-division step; in effect, the side length of the sub-quadrate belonging to the maximum depth 4, is set equal to 1. From this there is obtained the side length of the entire quadrate to $2^{maximum\ depth}$; in the present example to $2^4=16$.

This specified quadtree structure should then be traversed by the semi-infinite straight-line or ray 29 emanating from point S with the slope $m_y=0.38$. The starting point S can relate to the observation point S illustrated in FIG. 1; the semi-infinite straight-line 29 of FIG. 7 then corresponds to one of the primary rays 4, 5 or 6 in FIG. 1. This point S can, in any event, also relate at all times to the impact point 8 in FIG. 1; then the semi-infinite straight-line 29 corresponds to the secondary ray 9.

Figure 8:
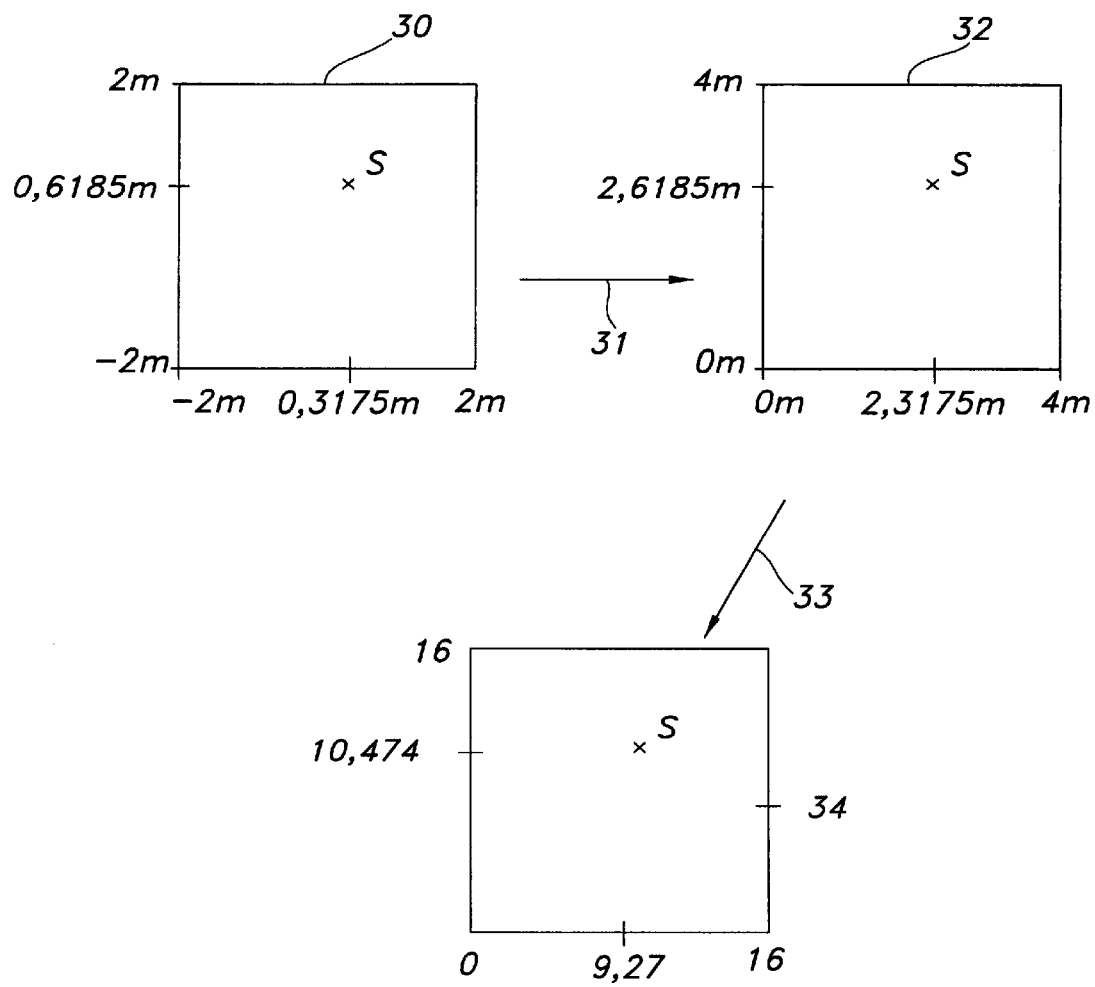
FIG. 8 is an example of a coordinate transformation which converts suitable initial coordinates into a binary representation adapted for the partitioning.

The starting point S can be given in any suitable coordinate system. In FIG. 8, at the upper left there is represented a coordinate system 30 whose x-range ranges from −2 meters up to +2 meters, and whose y-range is similarly from −2 meters up to +2 meters. The starting point S in this coordinate system is given through the coordinates (0.3175 meters; 0.6185 meters).

Thereafter, there should then be effected a displacement 31 of the entire coordinate system 30 to such a configuration that the range in the values of the x-coordinates as well as the range in the values of the y-coordinates of all considered objects are displaced into the non-negative range. In the example illustrated in FIG. 8 this is effected through a translation 31 about $$\text{the vector } \vec{v} = \begin{pmatrix} 2 & \text{meter} \\ 2 & \text{meter} \end{pmatrix}.$$

The new coordinates of the starting point S in the displaced coordinate system 32 are obtained as (2.3175 meters; 2.6185 meter).

In the next step, step 33, the thus displaced original coordinates are re-computed by means of a scaling factor g into the binary coordinate system of the partitioned surface area with the side length $2^{maximum\ depth}$. The scaling factor g is thereby $g=(2^{maximum\ depth}/r)$, whereby r is the maximum expansion of the original coordinate system. In the example illustrated in FIG. 8, the maximum depth is equal to 4, r=4 meters, and obtained therefrom is $g=4$ meter$^{-1}$. For the starting point S there are thereby obtained the coordinates (9.27; 10.474). This starting point S with the coordinates (9.27; 10.474) is drawn in as the starting point of the semi-infinite straight-line 29 in FIG. 7. Inasmuch as S is only present in suitable coordinates, in the next step there must be determined the unit quadrate 35, in which S is located. This unit cell is a quadrate with the edge length 1. The unit cell encompassing the starting point; however, can but need not coincide with a terminal cell of the space partition. In the case shown in FIG. 7, the unit cell 35 which contains a starting point S does not coincide with the encompassing terminal cell, which here is a cell of the edge length 4.

The integer or whole-numbered coordinates of the impact point 36 of the unit cell 35 are obtained through a truncation of the binary coordinates of the starting point S, which signifies that the fractional amount location were stricken. From (9.27; 10.474) there is consequently obtained the impact point 36 at (9;10). By means of this impact point there is also defined the unit cell 35 encompassing the starting point S, whose x-value range is from 9 to 10, and whose y-value range reaches from 10 to 11.

Figure 9:
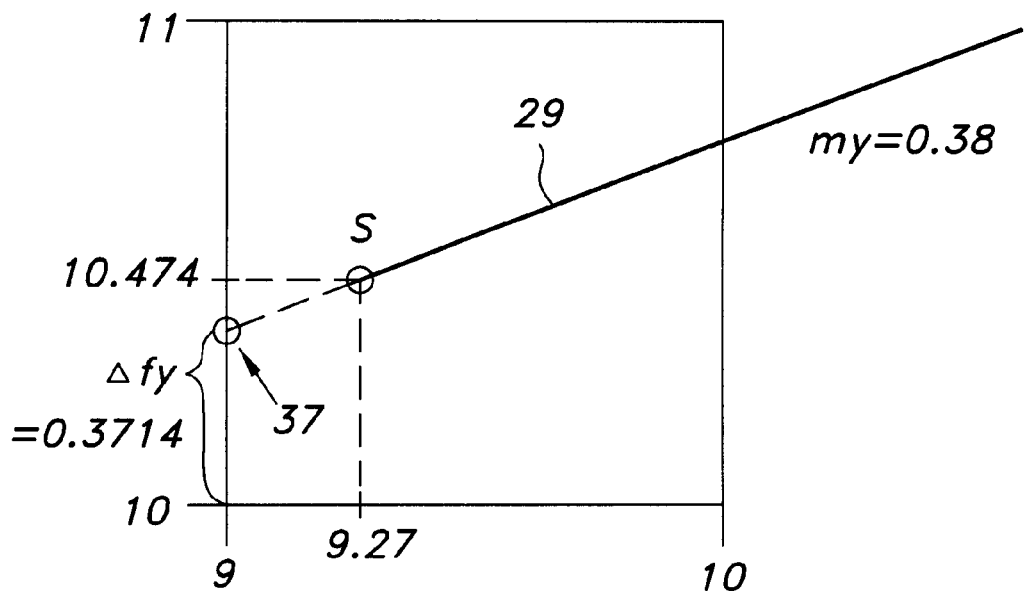
FIG. 9 illustrates the method for determining the initial-offset in the secondary components belonging to the starting point S.

The fractional, or after decimal point, locations of the binary coordinates 9.27 and 10.474 of the starting point S are expediently re-computed into a single initial offset $\Delta f_y$ in the direction of the secondary components y. This is illustrated in FIG. 9, which illustrated unit cell 35 encompassing the starting point on an enlarged scale. Through a rearward extension of: the semi-infinite straight-lines or ray 29 from over: the starting point S, there can be determined the intersecting point 37 with the rear wall of the unit cell 35 which is defined by x=9. The initial offset $\Delta f_y$ is obtained from the distance from the intersecting point 37 to the (whole-numbered) y-component of the impact point 36. The advantage of this recomputation of the two fractional or after the decimal point locations positions of the coordinates from S into one initial offset of the auxiliary component y, lies in that in the future, in the direction of the main components x there can be computed in integers or whole numbers. In the direction of the main components x, the consideration of the fractional number locations, or respectively, error values is rendered superfluous in the further continuing of the method.

In the case illustrated in FIG. 9, there is obtained $\Delta f_y$ as follows:

$\Delta f_y$=(the fractional or after the decimal point locations in the y-direction)−$m_y$×(fraction locations in the x-direction)=0.474−0.38×0.27=0.3714.

Up to now there has been determined the unit cell 35 which encompasses the starting point S. In the next step this pertains to determining the terminal cell of the quadtree partition which encompasses the starting point S. This terminal cell can be either the unit cell encompassing the starting point itself, or can be a larger cell which contains this unit cell.

Figure 10:
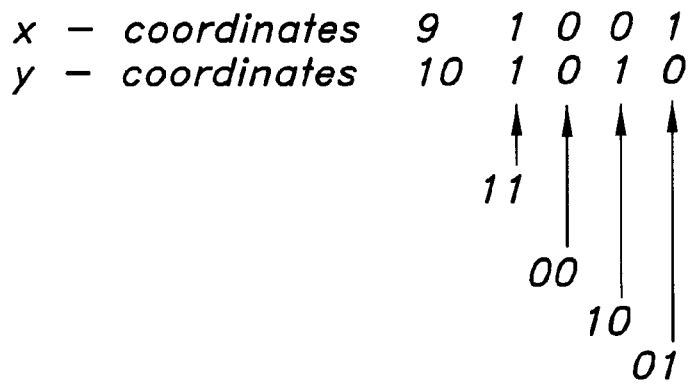
FIG. 10 illustrates an example as to the manner in which commencing from a specified unit cell there can be found that terminal cell of a quadtree, which contains this unit cell.

For determining the encompassing terminal cell there is utilized the indexing for the quadtree as illustrated in FIG. 3. For determining the sought after terminal cell describing sequence of quadtree indices there is initially written the truncated coordinates of the starting point as binary numbers in lines among each other, as illustrated in FIG. 10. The x-coordinate 9 hereby corresponds to the binary number "1001", whereas the y-coordinate 10 corresponds to the binary number "1010". There is then available that, through a readout of the columns of these superimposingly written binary numbers, from the bottom upwardly, and from left to the right, there are obtained the indices for the quadtree. The left column, read out from the bottom upwardly, produces the binary number "11". As a result, the first index for the quadtree reads as "3"; however, there is also selected the right upper sub-quadrate of the entire quadrate. With respect to this sub-nodal point, there must be tested as to whether this already relates to the terminal nodal point. The upper right sub-quadrate of the entire quadrate as illustrated in FIG. 7, is not the terminal nodal point. Consequently, the subsequently following index in the quadtree must be determined by reading out the subsequently following column. The reading out of the second column from the left, from below upwardly, produces the index "00". The next index in the quadtree thereby shows on the sub-cell with the index "0", in effect, the left lower sub-cell of the right upper quadrate in FIG. 7. This is the sub-cell which extends in the x-area as well as also in the y-area from 8 to 12. Again there is tested as to whether this sub-cell already pertains to the terminal cell of the quadrate, and this is here positively confirmed. Thereby, there has been found the terminal cell which encompasses the unit cell, and as a result the two remaining columns in FIG. 10 of the above each other written binary numbers need no longer be read out. The method for determining the terminal cell is thereby completed.

With regard to this terminal cell, there is interrogated as to whether it contains objects or not. In the event that the terminal cell contains objects, there must be interrogated as to whether the semi-infinite straight-line or ray strikes against one of these objects. When within the terminal cell containing the starting point such a impact point has been found, then the method is ended. Otherwise, the method is continued and the adjacent terminal cell which is traversed by the semi-infinite straight-line or ray, must be determined.

For this purpose, the intersecting point of the semi-infinite straight-lines 29, which is identified in FIG. 7 with the reference numeral 37, must be found with the similarly determined terminal cell, whereby this intersecting point should be reached through the least possible number of the possibly simplest implementable steps.

Accordingly, there are subsequently defined the following parameters: maxx should designate the maximum x-coordinates of the considered terminal cell. In the exemplary case considered in FIG. 7 maxx=12. Correspondingly maxy should represent the maximum y-coordinates in the terminal cell encompassing the starting point S. In the present instance, maxy=12. As diffx, there is defined the distance of the integer or whole-numbered impact point coordinate in the x-direction (in effect, in the direction of the main components) from maxx. Obtained thereby is diffx= maxx −9=3.

This x-difference which is also drawn in FIG. 7 gives the distance to the right side wall of the terminal cell which is defined through maxx=12. Correspondingly, the parameter diffy is determined from the distance of the whole-numbered impact point coordinate in the y-direction from maxy. The parameter diffy thereby provides the integer of whole-numbered difference to the upper side wall of the encompassing terminal cell, which is determined through maxy= 12. In the example shown in FIG. 7, there is obtained diffy=maxy−10=2.

Hereinbelow there should be attempted that through a sequence of decrementing steps to be able to reach either the right or the upper wall of the encompassing terminal cell. For this purpose, the step intervals should be determined in the direction of the main component x- as well as in the direction of the secondary components, in this instance y.

The basic structure of this table is illustrated in FIG. 11A. This table contains a descending sequence of x-step intervals, as well as associated y-step intervals. In the x-direction there is commenced with the decrement $2^{maximum\ depth}$, which corresponds to the x-expansion of the entire partitioned surface. The next x-step interval of the sequence $2^{maximum\ depth-1}$ is, in effect, the next smaller power of two. The x-step intervals are also obtained through a continued halving of $2^{maximum\ depth}$. This is continued until the last x-step interval 1 is reached. It is important that in the direction of the main components there are employed only integers or whole-numbered decrements. In the direction of the main components there must not be considered any kind of fractional amount locations, positions, it can be computed in whole-numbers.

The y-step intervals belonging to the individual x-step intervals are determined through multiplication with a rise in the y-direction, $m_y$. The obtained y-decrements are not whole-numbered, they possess fractional decimal point. The component ahead of the decimal point of the respective y-decrements is indicated in the column "y-step interval", whereas the fractional amount location are plotted in the column "yerror".

When thus $y=m_y \times 2^{maximum\ depth}$ is valid, then in the column "y-step intervals" there appears the truncated y-value $\lfloor y \rfloor$, whereas the fractional amount, component $(y-\lfloor y \rfloor)$ appears in the column "yerror". Through a continued halving of y-and subsequent truncating of the thus obtained value, there can be determined the remaining y-decrements of the sequence. The produced fractional amount locations are plotted in the column "yerror".

In FIG. 11B there is computed this table explicitly for the example shown in FIG. 7. Inasmuch as the maximum depth is equal to 4, for the descending sequence one begins with the x-step intervals with $2^4=16$. The semi-infinite straight-line 29 has the rise $m_y=0.38$, and thereby there is obtained the y-step intervals to 16×0.38=6.08 associated with the y-decrement 16. The integer or before the decimal point component 6 appears in the column "y-step intervals", whereas the fractional amount component 0.08 is listed in the column "yerror". Through the continued halving and subsequent truncating of 6.08 there is then obtained the remaining y-decrements of the sequence.

The thus obtained x- as well as y-decrements are then subtracted in a descending sequence from the wall distances diffx and diffy, until one of these wall distances is 0. One begins with the x-decrement which corresponds to the side length of the presently considered terminal cell. For example in FIG. 7 the side length of the considered terminal cell is equal to 4, and as a result, the first decrement which is to be tested for is the decrement with the x-step interval 4 and the y-step interval 1, whereby also the yerror of 0.52 must be considered. The parameters diffx and diffy are then reduced only by the whole-number component of the applicable decrement, when the result is non-negative. Consequently, the x-step intervals 4 cannot be taken off from the diffx=3. The decrement with the x-step interval 4 and with the y-step width 1 are thereby discarded. This is illustrated in FIG. 11B by a minus ahead of the x-step interval 4.

Thereafter, considered is the decrement with the x-step interval 2 and the y-step interval 0 at a yerror of 0.76. The x-step interval of 2 can be subtracted from maxx without entering into the negative range. Obtained hereby is diffx_new=3−2=1. Also during reduction of the diffy by the whole numbered y-step interval 0, there are not encountered any problems: diffy_new=2. In any event, in the y-result there must also be considered the after the decimal point fractional locations, and namely the initial-offset in the y-direction as well as the yerror of 0.76 belonging to the considered decrement.

For error computation, there must be added the values of $\Delta f_y$, as well as of yerror. This is indicated in FIG. 12, as a result there is obtained 1.1314. There also occur remainders which must be considered in diffy_new: The actual diffy_new is obtained to 1, the actual yerror-new becomes 0.1314. The consideration of remainders from the error computation is only required for the secondary components. The error computation must hereby always be concluded prior to the implementation of the subsequent decrementing step to the extent in that any remainders are considered which have been obtained from the error computation.

The sequence of the decrements then processed down for so long until either the decremented distance diffx in the direction of the main components or the whole-numbered portion diffy of the decremented distance in the direction of secondary components becomes 0.

In the considered example, it is diffx_new=1 diffy_new=1 yerror_new=0.1314.

The terminating requirement that either diffx or diffy=0 is thereby not yet fulfilled. Consequently the next decrement must be considered with the x-step interval 1, the y-step interval 0 and the yerror 0.38.

Obtained as a result is diffx_new=1−1=0 diffy_new=1−0=1 yerror_new=0.1314+0.38=0.5114.

Here there is not encountered any remainders during error arithmetic. After the implementation of this decrementing step, the decremented distance in the y-direction has become 0. Thereby the terminating condition is fulfilled, and the sequence of decrementing steps is processed off.

The unit cell about the intersecting point is clearly obtained from the decremented distances obtained at the present termination, in the discussed example thus from the values of diffx, diffy and yerror. Thereafter, from these values there should be obtained the impact point 38 of those unit cells 39 which are traversed by the semi-infinite straight-lines or rays 29, after these have passed through the intersecting point 37 (see FIG. 7). In the discussed example the terminating condition diffx=0 was fulfilled, and for this case the impact point 38 of the adjoining unit cell of 39 can be determined in that from the maxx or, respectively, maxy values of the similarly traversed terminal cell there were drawn off the diffx, or respectively diffy values present at the termination. Thus, valid is x=maxx-diffx_new=12−0=12 y=maxy-diffy_new=12−1=11.

The impact point 38 of the unit cell 39 thereby possesses the coordinates (12;11). The unit cell extends in the x-range from 12 to 13, and in the y-range from 11 to 12.

Figures 15, 16:
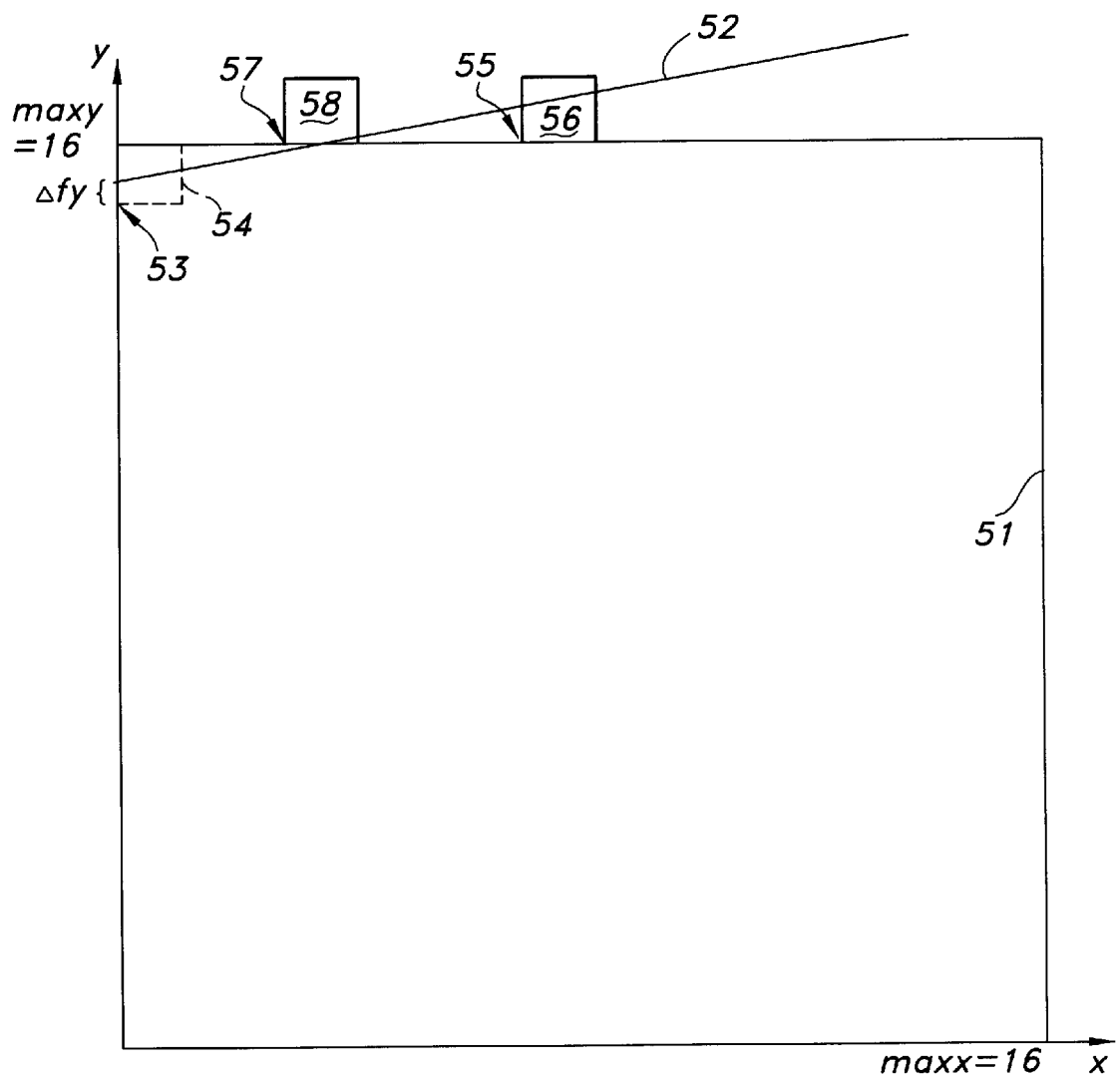
FIG. 15 illustrates an example for the determination of the intersecting point for the special instance of a passing incidence of the semi-infinite straight-line.
FIG. 16 illustrates a table of x- and y-decrements which are associated with the example shown in FIG. 15.

This computation of the coordinates of the impact point 38 of the adjoining unit cell is in all instances only applicable for the case in that the terminating condition diffx=0 has lead to the terminating of the decrementing steps, whereby diffy is unequal to 0. For the case in which not the decremented distance in the main component but rather the decremented distance in a secondary component become 0 first, or for the case wherein the two decremented distances become concurrently 0, this computation is not applicable. For these cases the procedure on the basis as shown in FIGS. 15 and 16 must be utilized.

Thereby the unit cell 39 which bounds the intersecting point 37 has been found. In the now following step there must be determined those terminal cells of the quadtree which contain the thus obtained unit cell.

The method for the discovering the encompassing terminal cell is represented in FIG. 13, and corresponds with the method represented in FIG. 10. Again, the binary representations of the x-coordinates 12 and of the y-coordinates 11 of the impact point 38 are written in linewise below each other. Thereafter, the columns of this arrangement of zeros and ones are read out so as to thereby obtain the quadtree indices. The reading out is thereby effected from left to right and from below to upwardly. The reading out of the left column delivers the binary number "11" as the first index for the quadtree. This index "3" identifies in accordance with the scheme indicated in FIG. 3 the right upper sub-cell of the entire quadrate illustrated in FIG. 7. Thereafter there is tested as to whether the sub-cell is already a terminal cell of the quadtree structure. From FIG. 7 there can be ascertained that the left upper part quadrate of the entire quadrate evidences still further sub-divisions, and as a result, this does not yet relate to a terminal cell. For this reason, the next following column of the binary number array shown in FIG. 13 must be read out from the bottom, upwardly. Obtained then as the next index is the number "01", and with this index there is identified the right lower part quadrate of the heretofore determined (right upper) sub-cell. Also in this sub-quadrate the edge length 4 does not yet relate to a terminal cell; and, consequently, in the next step, there must be read out the third column from left of the vertically spaced written binary coordinates. In this manner, there can be determined the third index for the quadtree to "10" (binary) or respectively "2"(decimal). This index designates the left upper sub-quadrate 40 of the heretofore long determined sub-cell, and this sub-quadrate 40 relates to the desired terminal cell. Consequently, no further columns need to be read out. The sequence of the heretofore long determined three indices 3, 1, 2 enable the terminal cell 40 which contains the unit cell 39 to be clearly determined.

As a result, there is reached the goal of finding the terminal cell of the quadtree structure, which is next following in the direction of the ray 29. With respect to this terminal cell 40, there can now be interrogated as to whether it is empty or whether it contains structures. In the event that the terminal cell 40 relates to an empty cell, the method is again implemented, so as to find the next terminal cell. In the event that the terminal 40 contains any kind of structures, such as the objects 11 through 15 shown in FIG. 2, then there is implemented a collision computation between the contained structure and the semi-infinite straight-line or ray 29. Here there is encountered the possibility that the ray 29 misses the structure and passes the contained object without any collision. However, there is also the case that it can lead to a collision between the ray 29 and the object which is contained in the terminal cell 40. In this instance, there is found the desired impact point which corresponds with the impact point 8 in FIG. 1; and the method is thereby ended.

It must be emphasized that the collision investigation between the ray and the object contained in the cell 40 is not the subject matter of this invention. The subject matter of the invention is merely that from the quadtree structure the terminal cells which are traversed by the ray 29 are delivered in the correct series sequence. Thus, the foregoing pertains to peeling out from the cells from the quadtree structure, suitable candidates for the collision testing between ray and surface.

In the event that it is determined that the terminal cell 40 is empty, or in the event that it does not lead to a collision between the semi-infinite straight-line or ray 29 and the objects which are contained in the cell 40, then the described method is again implemented so as to be able to determine, in the ray direction, the subsequent terminal cell. In the example illustrated in FIG. 7, this relates to the terminal cell 41. Hereby, the previous value of yerror must be considered during the following error arithmetic. The actual value of yerror thus occurs in the following error arithmetic at the location of $\Delta f_y$. In this manner the different terminal cells of the quadtree are traversed in a correct series succession by the semi-infinite straight-lines or rays 29 for the collision testing.

As already previously described in that through the repeated implementation of the decrementing steps in the direction of the main components it is computed in whole numbers, whereas in the direction of the secondary components, in the represented example in the y-direction, there must be considered the fractional value locations of the different decrements. As illustrated in FIG. 12, within the frame work of the mentioned error arithmetic there must be implemented a summing up of the initial offset $\Delta f_y$, as well as of the applicable fractional value locations of the y-decrements. Hereby, it is of advantage to represent $\Delta f_y$ and the different yerror values as integers or whole-numbers, since such types of integer numbers can be summed up by processors at high speeds.

For example the values of $\Delta f_y$ and yerror can be represented as 16-bit numbers. The value range: of $\Delta f_y$ as well as of collective yerror values lie within the interval [0;1[. For the case of the representation of 16 bit numbers then this interval [0;1[ can be imaged as numbers between 0 and 65535. Thereby associated with the 0 is the hex number "0000", with the 0.5 there is associated the hex number "8000", to the 0.75 the hex number "C000", and so forth. On the right side of FIG. 12 there is illustrated the addition of $\Delta f_y$ and yerror in the hex decimal system. $\Delta f_y$ equals 0.3714 is represented as the hex decimal number "5F14", yerror=0.76 is represented as "C28F". These two 16 bit numbers can be added, for example, through an image processor at a high speed; as a result there is obtained the hex decimal number "121A3". The remainder 1 is considered in the diffy_new value, yerror_new is obtained as hexdecimal number "21A3". Naturally, for the implementation of the error arithmetic there can be also effected a more precise representation of the fractional value locations; for example, through utilization of 32-bit numbers. Basically every desired accuracy can be realized through suitable integer numbers.

The inventive method is in particular adapted to be implemented on a digital picture or image processor at a high speed. FIG. 14A illustrates the manner in which, with the aid of slide registers there can be obtained extremely rapidly the required sequence of decrements, whereby the whole-numbered locations as well as the fractional amount components are directly obtained. Commenced should be from the y-decrement 6.08, from which through continued halving there is obtained the entire descending sequence of y-decrements. In the uppermost line in FIG. 14A there is illustrated the employed binary representation of this y-decrement. The whole-numbered component 6 corresponds to the bit pattern "0110", the error value 0.08 is represented by the hex number "1479".

From the bit pattern which is combined from the whole-numbered or integer component and the fractional value component, by means of a slide register there is effect a displacement by one bit to the right, the result of this bit displacement is represented in the second line of FIG. 14A. Thereby, from the last bit of the whole-numbered component there is taken the bit with the highest value of fractional amount component (arrow 42), the fractional amount locations thereby assume in the hexa-decimal system the form "0A3B", which corresponds to a yerror value of 0.04. With the new fractional value component of 3 there is obtained the new y-decrement of 3.04, and to that extent the represented displacement to the right causes a precise halving of the applicable y-decrement. At a renewed displacement to the right there is obtained from the lower-valued "1" of the fractional amount component the highest-valued bit of the fractional amount component (arrow 43). Thus, it comes to a transfer from the whole-numbered to the fractional amount component. Thereby, the fractional amount component in the hexa-decimal system assumes the form "891E", which corresponds to a yerror of 0.52. By means of a multiplicity of displacements towards the right there can thus be generated the entire descending sequence of y-decrements. Also the sequence of (whole numbered) x-decrements can be generated through continued rightward displacements. It must be emphasized, that the sequence of the x- or, respectively, y-decrements for each semi-infinite straight-line or ray must be computed only a single time, the obtained values can then be utilized for the determination of collective terminal cells which are traversed by the semi-infinite straight-lines or rays.

In FIG. 14B there is represented an alternative method for determining the applicable whole-numbered and fractional value components of the y-decrements, which is similarly suitable for utilization in a rapid image processor. For this purpose the bit-sequence of the first y-decrement and namely the whole-numbered as well as the fractional value components are written into a memory storage cell 44.

Access to this memory storage cell can be carried out with the aid of a plurality of readout ports. The 16-bit wide readout port 45 then reads the fractional value component; in effect, the yerror value of the first y-decrement. The subsequent readout port 46 reads out the whole-numbered component of the first y-decrement (here the number 6). Engaging the memory storage cell 44 is additionally the 16-bit wide readout port 47, which in contrast with the readout port 45, is displaced towards the left by one bit. With the aid of the readout port 47, there can be read out the fractional value component of the second y-decrement of the sequence. By means of the readout port 48 which is connected to this readout port, there is read out the whole-numbered component of the second y-decrement, in effect, here the number 3. The third y-decrement of the sequence, the number 1.52, can be obtained with the aid of readout ports 49 and 50, which are displaced towards the left by a further bit. By means of the described structure of mutually offset readout ports, it is possible to obtain the different y-decrements without any displacement to the right directly through the reading out of corresponding segments of the bit sequence. The advantage thereof is a further reduction in the processing time.

In the heretofore discussed two-dimensional case, the intersecting point of the semi-infinite straight-lines or rays with the encompassing terminal cell were only discussed for the case of a termination due to diffx=0. This case corresponds to an intersecting point at the right boundary of the encompassing terminal cell. Hereinbelow there should be discussed the case in which only after repeated decrementing is there first obtained the distance diffy=0. This case corresponds to an intersecting point which is located in the upper boundary of the terminal cell.

When the terminating condition is fulfilled with respect to a secondary component, there must be considered a few particularities. This is represented hereinbelow on the basis of FIGS. 15 and 16. Illustrated is a terminal cell 51 in which there is located the starting point S with the coordinates (0.4; 15.456). Commencing from this starting point is the semi-infinite straight-line or ray 52 extends with the slope $m_y$=0.19. The initial offset is determined to be $\Delta f_y$=0.4−0.456×0.19=0.38.

The impact point 53 of the unit cell 54 which encompasses the starting point S is (0;15). The maximum x- and, respectively y-coordinates of the terminal cells are maxx=16 and maxy=16. Obtained thereby is the initial diffx to diffx= maxx−0=16, as well as the initial diffy to diffy=maxy−15=1.

In FIG. 16 there is represented the associated table of x- and, respectively, y-decrements. Belonging to the x-decrement 16 is the y-decrement 16×0.19=3.04. Through a continued halving of the initial x-decrement as well as of the initial y-decrement, there is then obtained the entire table shown in FIG. 16.

Inasmuch as the encompassing terminal cell 51 possesses the side length 16, there is began with the decrement belonging to the x-step interval 16. However, when one would subtract the y-step interval 3 from diffy=1, one would land in the negative value range and this is prohibited. The first decrement of the table in FIG. 16 can thereby not be carried out; this is characterized by a minus sign in front of the first decrement.

Thereafter, there should be made an attempt to implement the decrement belonging to the x-step interval 8. Obtained is diffx_new=diffx−8=16−8=8
diffy_new=diffy−1=1−1=0
yerror_new=$\Delta f_y$+yerror=0.38+0.52=0.8.

The error arithmetic resultingly does not deliver any remainder. The new values of diffx and diffy are collectively non-negative, and consequently, this decrement can be implemented. Inasmuch as the new diffy is equal to 0, the terminating requirement is fulfilled, and consequently there can be obtained directly from the new values of diffx, diffy and yerror the intersecting point. This, however, is not possible in the present case.

Basically for the case of a terminating due to diffy=0 the impact point of the unit cell containing the intersecting point is determined as follows:

x=maxx−diffx−1=16−8−1=7
y=maxy−diffy=16−0=16.

As a first particularity in the fulfilling of the terminating condition in the direction of a secondary component, there must be maintained that the value of maxx−diffx must always be additionally decremented by 1, so as to obtain the impact point 55 of the adjoining unit cell. Here, the impact point computation distinguishes itself for the case diffy=0 quite distinctly from the impact point computation in the case of diffx=0.

The thus obtained unit cell 56, however, in contrast with our expectation, does not contain the impact point. This represents a further particularity for the case of the terminating condition diffy=0, inasmuch as in particular it acts itself out at a passing incidence of the semi-infinite straight-line or ray 52. In that case, there must always be tested as to whether the terminating conditions diffy=0 can also not be fulfilled through a following smaller decrement. In our case, there must also be tested as to whether instead of the decrement characterized by the x-step interval 8, there is still a smaller decrement which similarly leads to the fulfilling of the terminating condition diffy=0. In that instance, the larger decrement may not be considered.

Consequently, in the following there should be investigated to be able from the initial values diffx=16, diffy=1 to take off the decrement characterized by the x-step interval 4. This leads to the following new values of diffx, diffy and yerror;

diffx_new=diffx−4=12
diffy_new=diffy−0=1
yerror_new=$\Delta f_y$+yerror=0.38 +0.76=1.14.

The error arithmetic produce a remainder which must be considered in diffy_new. There is obtained the diffy_ new=0 and yerror_new=0.14. Thereby, however, the terminating condition diffy=0 is also fulfillable through this smaller decrement, and consequently, the larger decrement must not be considered.

However it is also contemplatable, that through the decrement defined by the x-step interval 2 there is similarly fulfillable the condition diffy=0. This should be tested in the following. Again, there is commenced from diffx=16 and diffy =1. Obtained is diffx_new=16−2=14
diffy new=1−0=1
yerror_new=$\Delta f_y$+yerror=0.38 +0.38=0.76.

Here there is no remainder, diffy is not equal to 0 and as a result the terminating condition is not fulfillable through the decrement with the x-step interval 2. However it would be possible that through the additional consideration of the decrement with the x-step: interval 1, that there is fulfillable the terminating condition. The consideration of this decrement results in diffx_new=14−1=13
diffy_new=1−0=1
yerror_new=$\Delta f_y$+yerror=0.76 +0.19=0.95.

Inasmuch as no remainder is encountered, also this additional consideration of these decrements does not lead to that the terminating conditions can be fulfilled.

The overall result is presented in the table of FIG. 19 by a bracketed hook preceding the step interval 8, through a hook preceding the step interval 4, and through a minus in front of the step interval 2 and 1. The decrement which is to be considered is thereby the decrement with the x-step interval 4. The impact point 57 of the unit cell 58 containing the intersecting point is computed as follows:

x=maxx−diffx−1=16−12−1=3 y=maxy−diffy=16−0=16.

The impact point 57 of the searched for unit cell 58 is thereby (3;16). Thereby, there has been found the desired unit cell to the intersecting point.

UTILIZATION OF THE METHOD FOR TRAVERSING A THREE-DIMENSIONAL OCTREE STRUCTURE WITH A SEMI-INFINITE STRAIGHT-LINE OR RAY

Figure 17A:
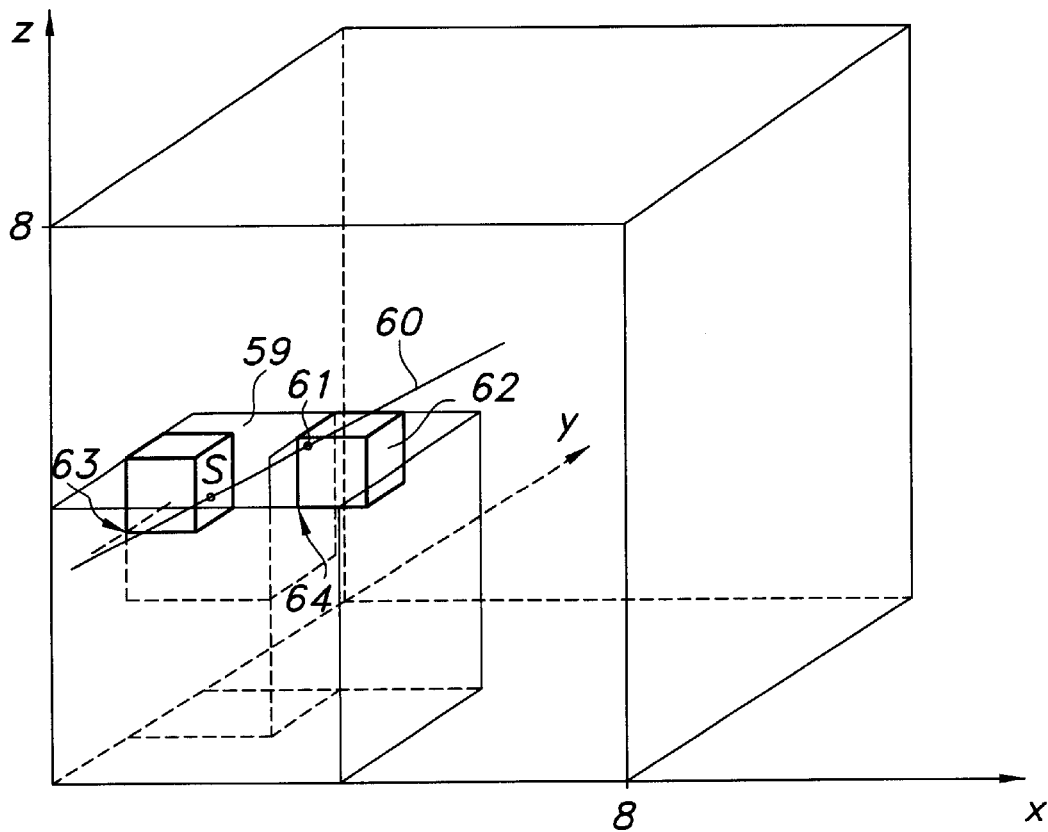
FIG. 17A illustrates an example for the application of the inventive method for the traversing of a three-dimensional octree structure.
Figure 17B:
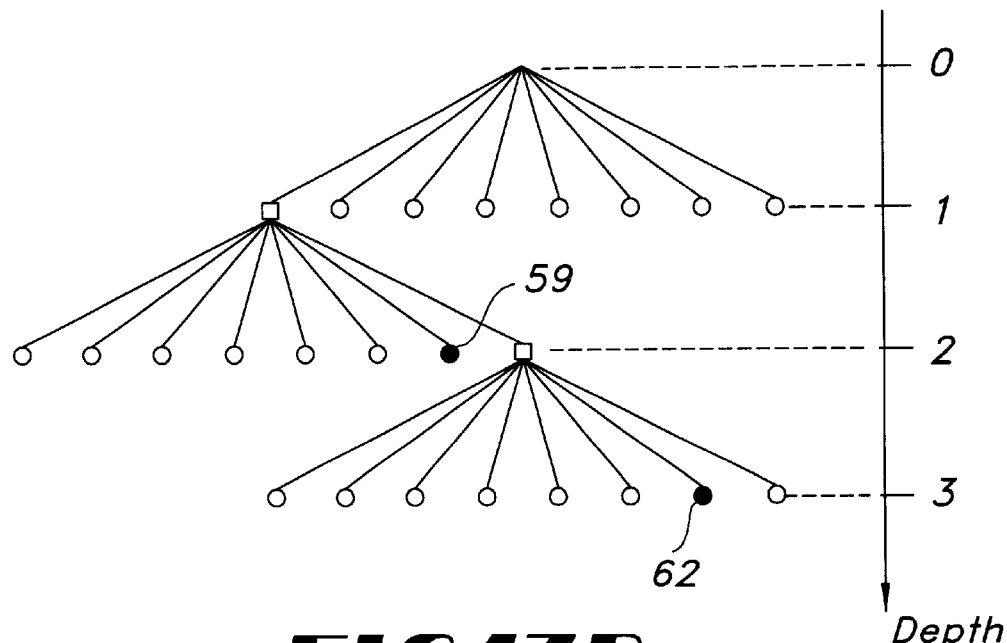
FIG. 17B illustrates a tree representation of the octree illustrated in FIG. 17A.

On the basis of an example as illustrated in FIGS. 17A, 17B and 18, there should hereinbelow be implemented the traversing of a three-dimensional octree structure along a semi-infinite straight-line or ray through the intermediary of the inventive method. The goal is that to be able to obtain the terminal cells which are traversed in series by the semi-infinite straight-line or ray. Commencing should be effected from the starting point S, whose coordinates are x=0.8; y=2.6 and z=3.2. The semi-infinite straight-line or ray 60 extending from this starting point S is represented in FIG. 17a and is determined through the two slopes $m_y$=0.48 and $m_z$=0.43. The two initial offsets $\Delta f_y$ and $\Delta f_z$ are obtained from the intersecting point of the rear wall of the unit cube containing the starting point with the rearwardly extended semi-infinite straight-line or ray 60. Obtained are $\Delta f_y$=0.6−$m_y$×0.8=0.216 as well as $\Delta f_x$=0.2−$m_z$×0.8=−0.144.

The octree structure which is to be traversed is illustrated in FIG. 17A. FIG. 17B illustrates the associated octree. The octree has a maximum depth of 3. As a result, the large cube which is represented in FIG. 17A, and which encompasses all sub-cubes, possesses the side length 8. The terminal cell 59 which encompasses the starting point does not relate to a unit cell, but to a sub-cell with the edge length 2. The associated sub-nodal point 59 with the depth 2 is also ascertainable in FIG. 17B. The goal of this method is to be able to determine the intersecting point 61 as well as the terminal cell 62 which bounds this intersecting point. For this purpose, there is initially computed the table of decrements as illustrated in FIG. 18. Due to the side length of the initial cube of the octree structure the first x-step interval of the table is equal to 8. The associate y-and z-decrements are computed as 8×$m_y$=3.84

8×$m_z$=3.44.

Through the continuous halving of all three step intervals there is obtained the table shown in FIG. 18. Prior to implementing the decrementing steps, the impact distances of the point 63 from the walls of the terminal cell 59 must be determined. The results diffx=2 diffy=2 diffz=1.

Due to the side length 2 of the encompassing terminal cell 59 there is began with the x-decrement 2, the y-decrement 0.96 as well as with the z-decrement 0.86.

The results diffx_new=diffx−2=0 diffy_new=diffy−0=2 yerror_new=$\Delta f_y$+0.96=0.216 +0.96=1.176.

In considering the remainder 1 there is obtained diffy_new=1 and yerror_new=0.176. In the z-direction the computation is as follows:

diffz_new=diffz−0=1 zerror_new=$\Delta f_z$+zerror=(−0.144)+0.86=0.656.

In the z-direction there is thus no excess encountered.

In the next step there is interrogated as to whether a new value of diffx, diffy or diffz is equal to 0. For diffx this is the case and consequently the terminating conditions are fulfilled.

In the next step it is intended to obtain the impact point 64 of that unit cell 62 which contains the intersecting point 61. Inasmuch as the terminating condition diffx=0 concerned to the main components, the computation of the whole numbers coordinates of the impact point can be undertaken as follows:

x=maxx−diffx=2−0=2 y=maxy−diffy=4−1=3 z=maxz−diffz=4−1=3.

The impact point 64 of the unit cell 62 has accordingly the coordinates (2;3;3).

Commencing from the unit cell 62 which contains the intersecting point, there is then determined the associated terminal cell. This is again carried out in that the coordinates of the impact point are recorded line by line among each other written in binary representation, whereby the indices for the octree can be read out as columns of this array, and namely, from left to right and from the bottom upwardly. This procedure is, however, unnecessary in the example illustrated in FIG. 17A, inasmuch as the unit cell 62 is already the terminal cell. Here the unit cell, in effect, coincides with the terminal cell. Also from the octree. representation in FIG. 17B there can be ascertained that the sub-nodal point 62 is a terminal nodal point. Sub-nodal point 62 is a nodal point of the dividing depth 3, which is the maximum depth of the division. Consequently the sub-nodal point 62 must be a terminal nodal point.

Through the initial implementation of a suitable permutation of the components there can be constantly achieved that the comparatively largest component is the x-component. As a result without any restriction in the generality of the precedingly described two-dimensional and three-dimensional examples, the x-components are proven as the main components, meaning the comparatively largest components. The amount of the rises of $m_y$, respectively $m_z$ were collectively ≦1.

Without any limitation of the generality in the preceding discussed examples there was also always commenced from positive slopes $m_y$, respectively, $m_z$. Should the directional vector of the semi-infinite straight-lines or rays, however, contain negative components, then through suitable coordinate mirror images these can be converted into positive components. The utilized component mirror-images must thus encompass the semi-infinite straight-line or ray, as well as the entire structure of the sub-cells.

Heretofore, there was discussed the applicability of the method for the two-dimensional as well as for the three-dimensional case. However, the method is also applicable to higher dimensions. A sensible example of an applicability of the method in four-dimensions comes from the range of the simulation of the acoustics for rooms. A computation of the sound propagation in a three-dimensional space must necessarily also encompass a time component. This time component can be considered as a fourth-dimension during the computation of the sound propagation. As a result, it is possible to model sound distortions, as well as echo effects which occur in a room. This can, in particular, find application (acoustic ray tracing) for simulation of sound: propagation in conference halls, multi-purpose halls and concert halls.

The method according to the invention is also applicable to a space partition in form of a K-d-Tree. At constructing a K-d-Tree a considered cell is decomposed into 4 sub-cells in case of a two-dimensional partition and into 8 sub-cells in case of a three-dimensional partition. The decomposition is performed using additional planes parallel to the limiting walls of the considered cell. By the additional partition walls the volume of the considered cell is divided into an arbitrary ratio. Therefore the resulting sub-cells are not of the same volume. The method according to the invention for traversing a terminal cell of a space partition is also applicable for traversing the terminal cells of the K-d-Tree.

Partitions including more than one additional partition wall per space direction of the considered cell can also be traversed by the method according to the invention.

Throughout the previous representation of the invention the distances diffx, diffy and diffz to the limiting walls of the enclosing terminal cell have been decremented step by step till the terminating condition was satisfied. Instead of the continued decremental procedure of the distances it is also possible to increment the coordinates of the characteristic point of the unit cell including the entry point into the terminal cell, step by step. The sequence of increments according to the invention is used for the individual incremental steps: $2^n$ in direction of the main component and $2^n \times$(rise m of the respective secondary component) in direction of a secondary component, where n is a natural number and $2^n$ successively takes the values "edge length of the encompassing terminal cell", . . . 2, 1 in descending order.

An incremental step is only performed when the considered terminal cell is not left on that occasion, i.e. the maximum coordinates maxx, maxy and maxz are not exceeded. An incremental step is performed only when both the whole-numbered portion of the main component and the whole-numbered portions of the secondary components stay smaller than or equal to the integer portions of the corresponding maximum coordinates of the considered terminal cell. Here the terminating condition can be formulated as follows: the whole-numbered portion of at least one component is equal to the whole-numbered portion of the corresponding maximum coordinate of the terminal cell. In this respect an incremental procedure of the whole-numbered coordinates of the characteristic point and a decremental procedure of the distances are equivalent.

In designing the image processor according to the invention for performing incremental steps it comprises the following features:

means for incrementing the main component by $2^n$ and the secondary components by $2^n \times$(rise m of the respective secondary component), whereby n is a natural number, whereby $2^n$ assumes in a descending sequence the values "edge length of the encompassing terminal cell", . . . 2, 1, whereby an incremental step is performed only when both the whole-numbered portion of the main component and the whole-numbered portions of the secondary components are smaller than or equal to the whole-numbered portions of the corresponding maximum coordinates of the terminal cell, and whereby the increments are processed in a descending sequence until the following terminating condition is fulfilled: the whole-numbered portion of at least one component is equal to the whole-numbered portion of the corresponding maximum coordinate of the terminal cell;

means for determining, from the values of the main component and the secondary components present upon the termination, the contiguous unit cell at the exit point of the semi-infinite straight-line from the terminal cell;

means for determining that terminal cell of the space partition which encompasses the contiguous unit cell.

What is claimed is:

1. Method for traversing a space partition, particularly a quadtree- or octree-partition, in the direction of a semi-infinite straight-line, whereby the parameter "maximum depth" defines the depth of the space partition, whereby $2^{maximum\ depth}$ is the edge length of the entire partitioned region, whereby the semi-infinite straight-line is given by a starting point as well as a directional vector, whereby the directional vector possesses a main component as well as secondary components, and whereby the amount of every secondary component is less or equal to the amount of the main component, characterized by the following steps:

(d) determining the distances of the semi-infinite straight-line's entry point into the terminal cell in the direction of the main component as well as in the directions of the secondary components from the walls of the encompassing terminal cell;

(f) decrementing of said collective specified distances in the direction of the main component by $2^n$ and in the direction of a secondary component by $2^n \times$(rise m of the respective secondary component), whereby n is a natural number, whereby $2^n$ assumes in a descending sequence the values "edge length of the encompassing terminal cell", . . . 2, 1, whereby the spacings in the direction of the main component and in the direction of the secondary components are reduced by the successively following decrement only when the whole-numbered components of the resulting decremented distances are collectively non-negative, and whereby the decrements are processed in a descending sequence until the following terminating condition is fulfilled: the decremented spacing in the direction of the main component and/or the whole numbered portion of the decremented spacing in the direction of at least one secondary component is zero;

(g) determining, from the decremented distances in the direction of the main component and in the directions of the secondary components present upon the termination, the contiguous unit cell at the exit point of the semi-infinite straight-line from the terminal cell;

(h) determining that terminal cell of the space partition which encompasses the unit cell determined in step (g).

2. Method according to claim 1, characterized in that for each semi-infinite straight-line given by a starting point as well as a directional vector, the following initializing steps are implemented:

(a) determining the unit cell in which there is located the starting point of the semi-infinite straight-line;

(b) determining the impact point of the unit cell, as well as the initial offsets belonging to the starting point;

(c) determining that terminal cell of the space partition which encompasses the unit cell determined in step (a).

3. Method according to claim 2, characterized in that the initial offsets belonging to the starting point are determined through setting to zero the initial offset of the main component as well as through computation of the associated initial offsets of the secondary components.

4. Method according to claim 1, characterized in that the following step is implemented preceding step (d) or between step (d) and step (f):
(e) producing and storing a descending sequence of decrements of $2^k$ in the direction of the main component and of $2^k \times$(rise m of the respective secondary component) in the direction of a secondary component, whereby k is a natural number and whereby k assumes values between the maximum depth of the space partition and 0.

5. Method according to claim 4, characterized in that for each semi-infinite straight-line step e) is performed only once.

6. Method according to claim 1, characterized in that the components of the directional vector are permutated prior to the beginning of the method so that the x-component is the main component.

7. Method according to claim 1, characterized in that in step (f) upon repeated decrementing of the main component as well as of the secondary components there is began with collective distances determined in step (d) with the decrement "edge length of the encompassing terminal cell" in the main component.

8. Method according to claim 1, characterized in that for the case in which the terminating condition has been fulfilled in that the whole-numbered portion of the decremented distance in the direction of at least one secondary component is zero, there is tested as to whether the same terminating condition is also fulfillable by at least one subsequent smaller decrement, and in the event that this is the case, discarding the original larger decrement.

9. Method according to claim 2, characterized in that with regard to the terminal cell obtained in step (c) or in step (h) there is tested as to whether it relates to a structure-filled cell or to an empty cell.

10. Method according to claim 9, characterized in that for the case in which the terminal cell is a structure-filled cell, there is determined with regard to this cell as to whether the semi-infinite straight-line collides with the structure contained therein.

11. Method according to claim 9, characterized in that the method according to claim 1 is repeated so often till a collision of the semi-infinite straight-line with a structure contained in a terminal cell is detected or till the space partition is traversed.

12. Method according claim 1, characterized in that the terminal cell of the space partition which encompasses a specific unit cell is determined by means of the following method:
(A) covering the actual nodal point with the uppermost nodal point of the partition tree;
(B) line-by-line arranging of the binary representations of the n truncated coordinates of a point of the unit cell;
(C) reading out, commencing from the left, the first column of the binary representations, whereby each column contains the binary representation of an index for the partition tree;
(D) determining the sub-nodal points of the actual nodal point corresponding to the readout index;
(E) testing as to whether the ascertained sub-nodal point is a terminal nodal point, and in the event of yes, ending the method;
(F) covering the actual nodal point with the ascertained sub-nodal point;
(G) reading out, commencing from the left, the subsequent column of the binary representations, which contains the subsequent index for the partition tree, and continuing with step (D).

13. Method according to claim 12, characterized in that the step (A) is implemented subsequent to steps (B) and (C), but prior to step (D).

14. Method according to claim 12, characterized in that steps (E) and (F) are exchanged.

15. Method according to claim 12, characterized in that for the case in which the space partition is a quadtree, the index for the sub-nodal points of one cell encompasses 2-bit,
whereby the indices for an upper left and a lower left sub-cell differ by exactly one bit,
whereby the indices for an upper right and a lower right sub-cell differ by precisely one bit,
whereby the indices for an upper left and an upper right sub-cell differ by exactly one bit, and
whereby the indices for a lower left and a lower right sub-cell differ by exactly one bit.

16. Method according to claim 15, characterized in that the indexing of the sub-nodal points of a cell are effected in the following manner:
the left lower sub-cell receives the binary index "00",
the right lower sub-cell receives the binary index "01",
the left upper sub-cell receives the binary index "10",
the right upper sub-cell receives the binary index "11".

17. Method according to claim 12, characterized in that for the case in which the space partition is an octree, the index for the sub-nodal points of a cell encompasses 3 bit,
whereby the indices for a front upper left and a front upper right sub-cell differ by exactly one bit;
whereby the indices for a front lower left and a front lower right sub-cell differ by exactly one bit;
whereby the indices for a rear upper left and a rear upper right sub-cell differ by exactly one bit;
whereby the indices for a rear lower left and a rear lower right sub-cell differ by exactly one bit;
whereby the indices for a front upper left and front lower left sub-cell differ by exactly one bit;
whereby the indices for a front upper right and front lower right sub-cell differ by exactly one bit;
whereby the indices for a rear upper left and a rear lower left sub-cell differ precisely by one bit;
whereby the indices for a rear upper right and a rear lower right sub-cell differ precisely by one bit;
whereby the indices for a front upper left and a rear upper left sub-cell differ by exactly one bit;
whereby the indices for a front upper right and a rear upper right sub-cell differ by exactly one bit;
whereby the indices for a front lower left and a rear lower left sub-cell differ by exactly one bit; and
whereby the indices for a front lower right and a rear lower right sub-cell differ by exactly one bit.

18. Method according to claim 17, characterized in that the indexing of the sub-nodal points of a cell for the case in which the space partition is an octree is effected in the following manner:
the front left lower sub-cell receives the binary index "000",
the front right lower sub-cell receives the binary index "001",
the front left upper sub-cell receives the binary index "010", the front right upper sub-cell receives the binary index "011", the rear left lower sub-cell receives the binary index "100", the rear right lower sub-cell receives the binary index "101", the rear left upper sub-cell receives the binary index "110", the rear right upper sub-cell receives the binary index "111".

19. Method according to claim 1, characterized in that the starting point is given in a suitable original coordinate system, which is converted by means of the factor g=$2^{maximum\ depth}/r$ into the binary coordinate system of the partitioned region with the side length $2^{maximum\ depth}$, whereby r is the maximum expansion of the original coordinate system.

20. Method according to claim 1, characterized in that the starting point is given in a suitable original coordinate system, which initially is displaced through a translation into the non-negative coordinate range, and which subsequently by means of the factor g=$2^{maximum\ depth}/r$ is converted into the binary coordinate system of the partitioned region with the side length $2^{maximum\ depth}$, whereby r is the maximum expansion of the original coordinate system.

21. Method according to claim 1, characterized in that the method is used for the computer-supported ray-based generating of digital images (ray tracing).

22. Method for traversing a space partition, particularly a quadtree or octree, in the direction of a semi-infinite straight-line, whereby the parameter "maximum depth" defines the depth of the space partition, whereby $2^{maximum\ depth}$ is the edge length of the entire partitioned region, whereby the semi-infinite straight-line is given by a starting point as well as a directional vector, whereby the directional vector possesses a main component as well as secondary components, and whereby the amount of every secondary component is less or equal to the amount of the main component, characterized by the following steps:

(f) incrementing the main component by $2^n$ and the secondary components by $2^n \times$(rise m of the respective secondary component), whereby n is a natural number, whereby $2^n$ assumes in a descending sequence the values "edge length of the encompassing terminal cell", ... 2, 1, whereby an incremental step is performed only when both the whole-numbered portion of the main component and the whole-numbered portions of the secondary components are smaller than or equal to the whole-numbered portions of the corresponding maximum coordinates of the terminal cell, and whereby the increments are processed in a descending sequence until the following terminating condition is fulfilled: the whole-numbered portion of at least one component is equal to the whole-numbered portion of the corresponding maximum coordinate of the terminal cell;

(g) determining, from the values of the main component and the secondary components present upon the termination, the contiguous unit cell at the exit point of the semi-infinite straight-line from the terminal cell;

(h) determining that terminal cell of the space partition which encompasses the unit cell determined in step (g).

23. Method according to claim 22, characterized in that for each semi-infinite straight-line given by a starting point as well as a directional vector, the following initializing steps are implemented:

(a) determining the unit cell in which there is located the starting point of the semi-infinite straight-line;

(b) determining the impact point of the unit cell, as well as the initial offsets belonging to the starting point;

(c) determining that terminal cell of the space partition which encompasses the unit cell determined in step (a).

24. Method according to claim 22, characterized in that the initial offsets belonging to the starting point are determined through setting to zero the initial offset of the main component as well as through computation of the associated initial offsets of the secondary components.

25. Method according to claim 22, characterized in that in step (f) upon repeated incrementing of the main component as well as of the secondary components there is began with the increment "edge length of the encompassing terminal cell" in the main component.

26. Method according to one of claims 22 through 25, characterized in that for the case in which the terminating condition has been fulfilled in that the whole-numbered portion of at least one secondary component is equal to the whole-numbered portion of the corresponding maximum coordinate of the terminal cell; there is tested as to whether the same terminating condition is also fulfillable by at least one subsequent smaller increment, and in the event that this is the case, discarding the original larger increment.

27. Image processor for the ray-based generation of digital images (Ray Tracing), wherein a space partition is traversed in the direction of a semi-infinite straight-line for calculating the ray path, whereby the semi-infinite straight-line is given by a starting point as well as a directional vector, whereby the directional vector possesses a main component as well as secondary components, and whereby the amount of every secondary component is less or equal to the amount of the main component, whereby the parameter "maximum depth" defines the depth of the space partition, whereby $2^{maximum\ depth}$ is the edge length of the entire partitioned region, characterized by means for determining the distances of the semi-infinite straight-line's entry point into the terminal cell in the direction of the main component as well as in the directions of the secondary components from the walls of the encompassing terminal cell;

means for decrementing said collective specified distances in the direction of the main component by $2^n$ and in the direction of a secondary component by $2^n \times$(rise m of the respective secondary component), whereby n is a natural number, whereby $2^n$ assumes in a descending sequence the values "edge length of the encompassing terminal cell", ... 2, 1, whereby the spacings in the direction of the main component and in the direction of the secondary components are reduced by the successively following decrement only when the whole-numbered components of the resulting decremented distances are collectively non-negative, and whereby the decrements are processed in a descending sequence until the following terminating condition is fulfilled: the decremented spacing in the direction of the main component and/or the whole numbered portion of the decremented spacing in the direction of at least one secondary component is zero;

means for determining, from the decremented distances in the direction of the main component and in the directions of the secondary components present upon the termination, the contiguous unit cell at the exit point of the semi-infinite straight-line from the terminal cell;

means for determining that terminal cell of the space partition which encompasses said contiguous unit cell.

28. Image processor according to claim 27, characterized in that the decrements in the secondary directions encompass a whole-numbered portion as well as a fractional value portion.

29. Image processor according to claim 28, characterized in that the whole-numbered portions of the decrements in the secondary directions are represented as integer numbers.

30. Image processor according to claim 28, characterized in that the fractional value portions of the decrements in the secondary directions are represented as integer numbers.

31. Image processor according claim 24, characterized in that the initial offsets are represented as integer numbers.

32. Image processor according to claim 27, characterized in that the entire sequence of the decrements of the main component as well as the associated decrements of the secondary components are produced through slide registers.

33. Image processor according to claims 27, characterized in that the entire sequence of the decrements of the main component as well as the associated decrements of the secondary components are produced by means of a multiplicity of read-out ports which are mutually offset relative to each other by respectively one bit.

34. Image processor according to claim 27, characterized in that the image processor for implementing the method according to one of claims 12 through 20 encompasses an array, in which the binary representations of the n truncated coordinates of a point of the unit cell are stored, and from which there can be read out the binary representations of the indices for the partition tree.

35. Computer program product loadable into the internal memory of a digital computer, comprising software code portions for performing the steps of claim 1, when said product is run on a computer.

* * * * *